United States Patent [19]

Hayama

[11] Patent Number: 4,799,078

[45] Date of Patent: Jan. 17, 1989

[54] CAMERA WITH SHUTTER ACTUATED BY PIEZOELECTRIC ELEMENT AND FLASH LIGHT EMITTING MEANS

[75] Inventor: Koh Hayama, Osaka, Japan

[73] Assignee: Minolta Camera Kabushiki Kaisha, Osaka, Japan

[21] Appl. No.: 156,902

[22] Filed: Feb. 17, 1988

[30] Foreign Application Priority Data

Feb. 18, 1987 [JP] Japan .................... 62-36570

[51] Int. Cl.[4] .............. G03B 7/26; G03B 15/05; G03B 17/38
[52] U.S. Cl. ..................... 354/412; 354/418; 354/457; 354/484; 354/127.12; 354/268
[58] Field of Search ............. 354/412, 413, 418, 419, 354/465, 457, 471, 484, 268, 266, 127.1–127.12

[56] References Cited

U.S. PATENT DOCUMENTS

| | | | |
|---|---|---|---|
| 4,126,877 | 11/1978 | Ohtaki et al. | 354/152 X |
| 4,190,336 | 2/1980 | Frank et al. | 354/457 |
| 4,190,344 | 2/1980 | Ishiguro et al. | 354/468 X |
| 4,214,827 | 7/1980 | Tominaga et al. | 354/268 X |
| 4,291,958 | 9/1981 | Frank et al. | 352/140 X |
| 4,407,573 | 10/1983 | Wakabayashi | 354/413 |
| 4,464,039 | 8/1984 | Ishida | 354/418 |
| 4,549,799 | 10/1985 | Inagaki | 354/400 |
| 4,603,954 | 8/1986 | Egawa et al. | 354/137 |
| 4,609,275 | 9/1986 | Ishiguro | 354/453 X |
| 4,676,625 | 6/1987 | Alyfuku | 354/418 |
| 4,751,545 | 6/1988 | Iguchi | 354/418 |

FOREIGN PATENT DOCUMENTS

| | | |
|---|---|---|
| 53-95620 | 8/1978 | Japan . |
| 58-228316 | 12/1983 | Japan . |
| 59-186381 | 10/1984 | Japan . |
| 59-204014 | 11/1984 | Japan . |
| 60-12523 | 1/1985 | Japan . |
| 60-39631 | 3/1985 | Japan . |
| 60-52832 | 3/1985 | Japan . |
| 60-144726 | 7/1985 | Japan . |
| 60-159701 | 8/1985 | Japan . |

Primary Examiner—W. B. Perkey
Attorney, Agent, or Firm—Burns, Doane, Swecker & Mathis

[57] ABSTRACT

A camera with a flash light emitting element and a piezoelectric element for actuating a shutter wherein successive rapid photographing is enabled. The camera comprises a single main capacitor, and a first voltage detecting means for detecting a first charged voltage of the capacitor required to drive a piezoelectric actuator element for the shutter of the camera, and a second voltage detecting means for detecting a higher second charged voltage of the capacitor required to drive the piezoelectric element and cause a flash light emitting means to emit light. In response to an output of a light measuring means, the first voltage detecting means is selected when the brightness of the object is higher than a predetermined brightness, and the second voltage detecting means is selected when the brightness of the object is lower than the predetermined brightness.

5 Claims, 17 Drawing Sheets

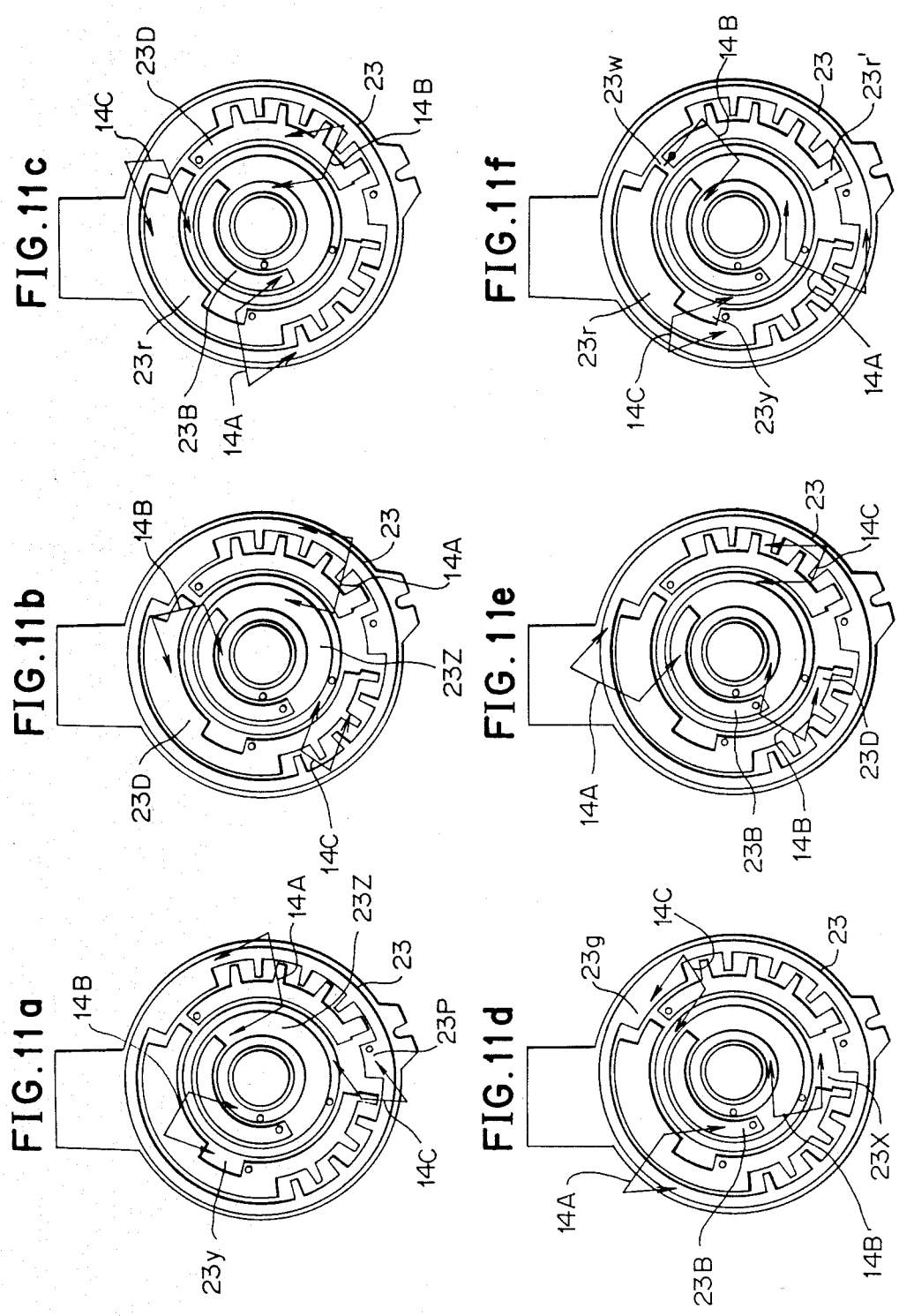

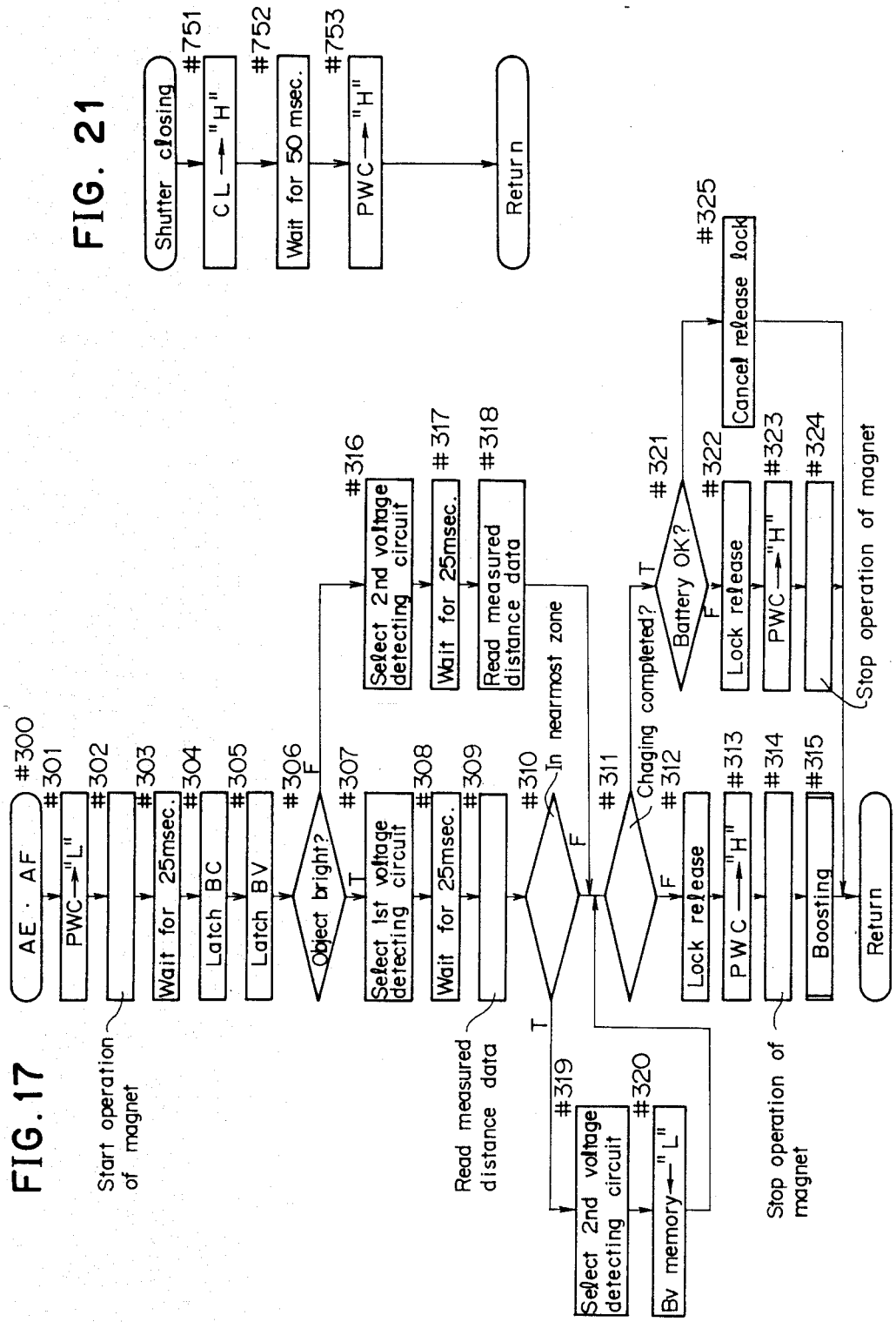

CAMERA WITH SHUTTER ACTUATED BY PIEZOELECTRIC ELEMENT AND FLASH LIGHT EMITTING MEANS

BACKGROUND OF THE INVENTION

1. Field of the Invention

This invention relates to a camera with a shutter actuated by a piezoelectric actuating element and a flash light emitting means.

2. Description of the Prior Art

Various types of shutters which are actuated by a piezoelectric element have been proposed so far, and one of such shutters is disclosed, for example, in Japanese Patent Laid-Open No. 60-144726.

In order to assure stabilized actuation of a piezoelectric element which is used for actuation of a shutter, a stabilized high voltage must be applied across the piezoelectric element. To this end, it is convenient to accumulate electric charge of a sufficiently high voltage to be applied to a piezoelectric element in a separately provided charging means such as a capacitor and to supply the accumulated charge to the piezoelectric element when the piezoelectric element is to operate.

Meanwhile, a camera which is provided with a flash light emittng means such as a flash device normally includes a main capacitor for the flash light emitting means. In such a camera, the main capacitor is charged with electric charge so as to apply a stabilized high voltage to the flash light emitting means.

Thus, in a camera which includes a shutter actuated by a piezoelectric element and a flash light emitting means, a main capacitor for the flash light emitting means is used also as a capacitor for driving the piezoelectric element.

However, if the capacitor is in any case charged up to a sufficiently high voltage to drive the piezoelectric element and cause the flash light emitting means to emit light, when the flash light emitting element need not be caused to emit light, a waiting time will be interposed until photographing is enabled because photographing is enabled only after the capacitor is charged to a predetermined voltage which is excessively high for driving of the piezoelectric element but is required to cause the flash light emitting means to emit light.

SUMMARY OF THE INVENTION

Accordingly, it is an object of the present invention to provide a camera with a flash light emitting element and a piezoelectric element for actuating a shutter wherein successive rapid photographing is enabled.

In order to attain the object, according to the present invention, there is provided a camera which comprises a single chargeable means, a boosting means for boosting a voltage of a power source to supply a high voltage to charge the chargeable means, a piezoelectric actuator element for actuating the shutter of the camera, a first voltage detecting means for detecting that the chargeable means is charged to a first voltage required to drive the piezoelectric actuator element, a flash light emitting means, a second voltage detecting means for detecting that the chargeable means is charged to a second voltage required to drive the piezoelectric element and cause the flash light emitting means to emit light, a light measuring means for measuring a brightness of an object, and a selecting means operable in response to an output of the light measuring means for selecting the first voltage detecting means when the brightness of the object is higher than a predetermined brightness and for selecting the second voltage detecting means when the brightness of the object is lower than the predetermined brightness.

With the camera of the construction described above, when an object is sufficiently bright and accordingly the flash light emitting means need not emit light, the first voltage detecting means is selected, and then after the chargeable means is charged to the first voltage which is required to drive the piezoelectric actuator element, photographing is enabled. On the contrary, when an object is not sufficiently bright and accordingly it is necessary to cause the flash light emitting means to emit light, the second voltage detecting means is selected, and then only after the chargeable means is charged to the second voltage which is required to drive the piezoelectric actuator element and cause the flash light emitting means to emit light, photographing is enabled. Accordingly, upon photographing without using the flash light emitting means, a photographer need not wait until the chargeable means is charged to the higher second voltage, which enables successive rapid photographing.

The above and other objects, features and advantages of the present invention will become apparent from the following description and the appended claims, taken in conjunction with the accompanying drawings.

BRIEF DESCRIPTION OF THE DRAWINGS

FIGS. 11a to 11f are plan views showing the switches and the encoder of FIG. 9 in an initial position of the photographing optical system in FIG. 3 in the standard photographing mode of the camera, in a focused position in the same mode, in an intermediate position during changing over between the standard and tele-photographing modes, in an initial position in the tele-photographing mode, in a focused position in the same mode, and in a final position in the standard photographing mode, respectively;

FIGS. 13 to 25 are flow charts illustrating controlling operation of the camera embodying the present invention;

DETAILED DESCRIPTION OF THE PREFERRED EMBODIMENTS

A camera to which the present invention is applied is a variable focus camera wherein a photographing optical system is constituted from a main lens and an auxiliary lens and, when standard photographing (short focus length photographing) is to be effected, only the main lens is used, but when tele-photographing (long focus length photographing) is be effected, the main lens is projected forwardly from the camera body while the auxiliary lens is inserted into a path of photographing light behind the main lens.

Further, the shutter of the camera of the embodiment is of a known type wherein it is actuated by a piezoelectric element. Therefore, description of the shutter is omitted herein.

Figure 1:
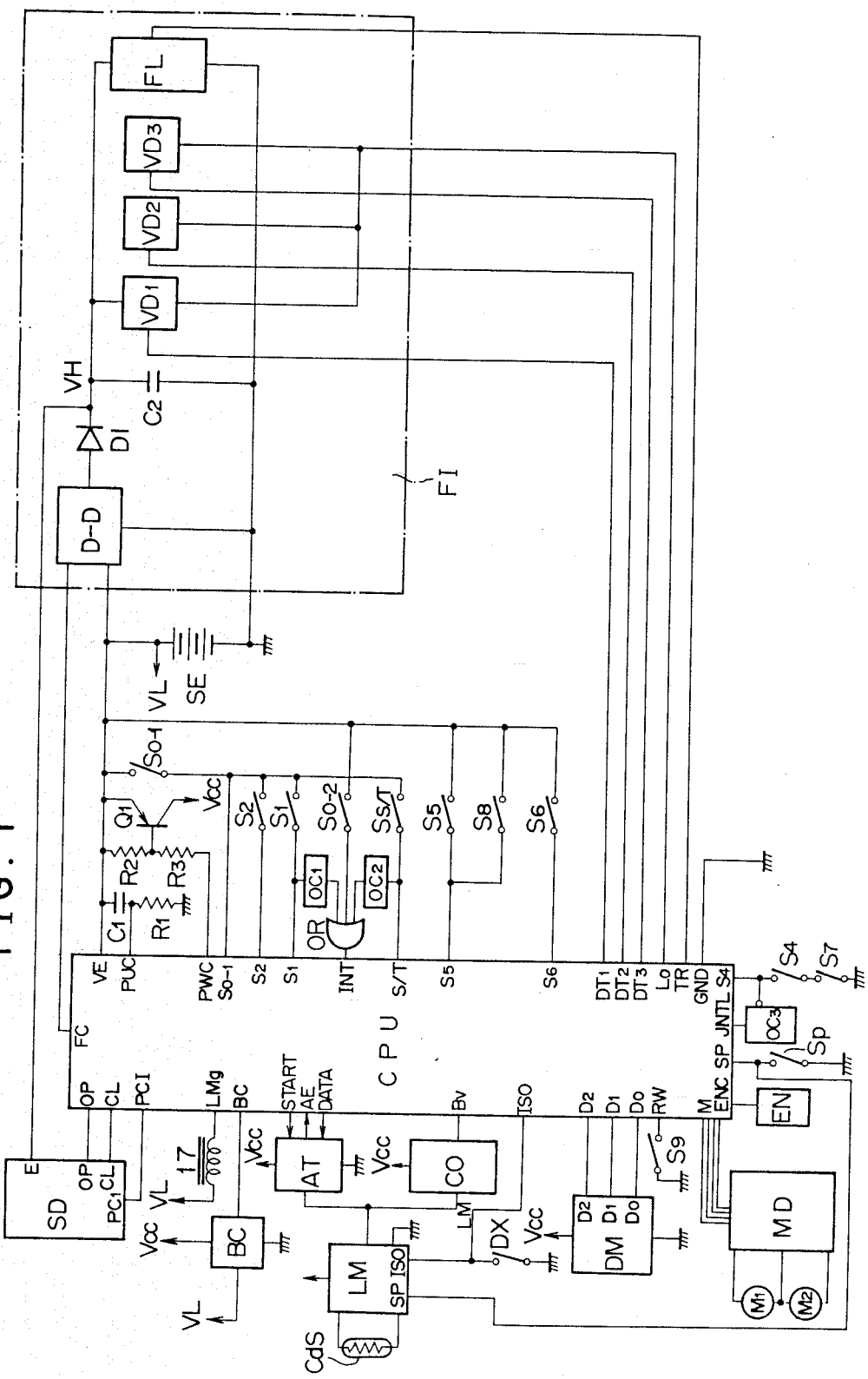
FIG. 1 is a circuit diagram of an electric circuit of a camera embodying the present invention.

Referring first to FIG. 1, there is shown a circuit diagram of an electric circuit of the camera embodying the present invention. The electric circuit shown includes a microcomputer CPU for controlling operation of the entire camera. The microcomputer CPU has a power source terminal $V_E$, a ground terminal GND, a terminal PUC for receiving a pulse upon closing of a power source, that is, upon loading of power supply batteries to cause initialization of the camera, a terminal PWC for transmitting a signal to control power supply to a light measuring circuit LM and some other circuits, a terminal INT for receiving an interrupt signal to cause interruption of the microcomputer CPU, and other various terminals connected to several circuits and several switches which will be hereinafter described. The terminal PUC of the microcomputer CPU is connected to a power supply line VL via a capacitor $C_1$ and also to a ground line via a resistor $R_1$. Accordingly, when a power source SE is closed, a differential pulse is formed by the capacitor $C_1$ and the resistor $R_1$ and is transmitted to the terminal PUC of the microcomputer CPU. Consequently, the microcomputer CPU begins initialization of the camera. The terinal PWC of the microcomputer CPU is connected to the power supply line VL via two series-connected resistors $R_2$ and $R_3$, and the base terminal of a pnp transistor $Q_1$ is connected to a junction between the two resistors $R_2$ and $R_3$. The emitter terminal of the transistor $Q_1$ is connected to the power supply line VL while the collector terminal is connected to another power supply line Vcc for the light measuring circuit LM and some other circuits. Accordingly, if a signal of a low voltage level (hereinafter referred to as signal "L" or only as "L") is delivered from the terminal PWC of the microcomputer CPU, the transistor $Q_1$ is rendered conducting so that power is supplied from the power source SE to power supply terminals of the light measuring circuit LM and so on via the transistor $Q_1$. An output of an OR circuit OR is connected to the interrupt terminal INT, and a pair of one-shot circuits $OC_1$ and $OC_2$ and a switch $S_{0-2}$ which instantaneously turns on upon opening or closing of a lens cover of the camera are connected to input terminals of the OR circuit OR. A light and distance measuring switch $S_1$ which turns on when a release button of the camera is depressed to a first position is connected to the one-shot circuit $OC_1$ while a photographing mode change-over switch $S_{S/T}$ which turns on when a photographing mode change-over button of the camera is depressed is connected to the other one-shot circuit $OC_2$. Accordingly, when the lens cover is opened or closed or when the release button is depressed to the first position to start measurement of light and a distance to an object or else hen the photographing mode change-over button is depressed to change over the photographing mode of the camera from a standard photographing mode to a tele-photographing mode or reversely from a tele-photographing mode to a standard photographing mode, a pulse is received at the interrupt terminal INT of the microcomputer CPU. Consequently, the microcomputer CPU starts operation thereof by interruption.

The electric circuit of FIG. 1 further includes a shutter driving circuit SD which includes a piezoelectric element though not shown. When a signal of a high voltage level (hereinafter referred to as signal "H" or only as "H") from the microcomputer CPU is received at a terminal OP of the shutter driving circuit SD, the shutter driving circuit SD applies a voltage received at a terminal E thereof via a line $V_H$ across the piezoelectric element in order to open the shutter, and then when another signal "H" from the microcomputer CPU is simultaneously received at another terminal CL of the shutter driving circuit SD, that is, when signals "H" are received at both of the terminals OP and CL, the piezoelectric element is short-circuited so that the shutter is closed. The shutter driving circuit SD has a further terminal PCI from which information of opening of the shutter is transmitted to the microcomputer CPU in the form of pulses which are each produced when the shutter is opened to one of predetermined positions of different opening degrees.

The electric circuit of FIG. 1 further includes a battery checking circuit BC for judging whether the voltage of the power source SE consisting of batteries is sufficiently high to operate the camera. The battery checking circuit BC thus delivers a signal "H" to a terminal BC of the microcomputer CPU when the power source voltage is sufficiently high but delivers a signal "L" when the power source voltage is not sufficiently high.

The light measuring circuit LM is designed to measure a brightness of an object by means of an externally mounted photoelectric cell CdS, correct a measured value for a photographing mode of the camera, and deliver a corrected measured value to an AE (automatic exposure) timer circuit AT and a comparator CO. An ISO sensitivity of a film is read into the light measuring circuit LM from a film magazine by means of a switch DX. The switch DX assumes an off state when the film sensitivity is lower than ISO 320, and assumes an on state when the film sensitivity is higher than ISO 400. Here, when the switch DX is off so that a terminal ISO of the circuit LM is open, the film sensitivity is determined to be ISO 100, but on the contrary when the switch DX is on so that a signal "L" is received at the terminal ISO of the circuit LM, the film sensitivity is determined to be ISO 400. Meanwhile, a photographing mode of the camera is judged from an on-off state of a switch Sp which assumes an off state in the standard photographing mode of the camera but assumes an on state in the tele-photographing mode of the camera. In particular, in the standard photographing mode of the camera, a terminal SP of the circuit LM is open, but in the tele-photographing mode, a signal "L" is received at the terminal SP. It is to be noted that the switches DX and Sp are connected also to terminals ISO and SP of the microcomputer CPU so that on-off information of the switches DX and Sp may be transmitted to the microcomputer CPU. The AE timer circuit AT starts its operation in response to a start signal from a terminal START of the microcomputer CPU and delivers to a terminal AE of the microcomputer CPU information that an appropriate amount of exposure light is reached when a photographing operation is to be performed without using a flash device. The comparator CO compares a measured value received at a terminal LM thereof from the light measuring circuit LM with a predetermined value to determine whether the object is sufficiently bright to eliminate the necessity of causing the flash device to emit light or the object is so dark that it is necessary to cause the flash device to emit light, and delivers a result of such determination to a terminal Bv of the microcomputer CPU. In particular, when the object is sufficiently bright, the comparator CO delivers a signal "H", but when the object is not sufficiently bright, it delivers a signal "L".

A distance measuring circuit DM is provided for measuring a distance between an object and the camera by means of an infrared ray emitting element and a light receiving element disposed on opposite sides of the finder of the camera, converting the thus measured distance information into a digital value of 3 bits $D_2$, $D_1$, $D_0$, and delivering the digital amount to terminals $D_2$, $D_1$, $D_0$ of the microcomputer CPU. In particular, the distance measuring circuit DM divides the distance to an available object into 7 zones as indicated in Table 1 below and provides distance information of a zone to which the measured distance between an object and the camera belongs in accordance with Table 1 below. For example, if the distance between an object and the camera belongs to the fourth zone (1.76 to 2.82 m), then the distance measuring circuit DM delivers signals "L", "L", "H" to the terminals $D_2$, $D_1$, $D_1$, respectively, of the microcomputer CPU.

TABLE 1

| Zone | Distance (m) | $D_2$ | $D_1$ | $D_0$ |
|---|---|---|---|---|
| 0th Zone | ~0.83 | L | L | L |
| 1st Zone | 0.83~1.02 | H | L | L |
| 2nd Zone | 1.02~1.30 | L | H | L |
| 3rd Zone | 1.30~1.76 | H | H | L |
| 4th Zone | 1.76~2.82 | L | L | H |
| 5th Zone | 2.82~4.00 | H | L | H |
| 6th Zone | 4.00~ | L | H | H |
| 4th Zone | 1.76~2.82 | H | H | H |

In accordance with the distance data received, the microcomputer CPU instructs the photographing optical system to move to a focused position. It is to be noted that the distance measuring circuit DM is designed such that it delivers signals "H" to the terminals $D_2$, $D_1$, $D_0$ of the microcomputer CPU as indicated at the lowest row of Table 1 for a period of time of about 40 milliseconds until distance measurement is completed after it begins to receive power at a terminal Vcc thereof, and the microcomputer CPU having received the distance data determines that the distance betwen an object and the camera belongs to the fourth zone (1.76~2.82 m). With the construction, even if some abnormal condition disables ordinary operation of the distance measuring circuit DM, an extremely out-of-focus photograph will not be produced because the microcomputer CPU determines that the distance between an object and the camera is substantially at a central position in an available distance measuring range and thus belongs to the fourth zone which is used most frequently.

A motor driving circuit MD is provided for controlling, in response to a signal received from a set of terminals M of the microcomputer CPU, driving of a film feeding motor $M_1$ for winding and rewinding a film and a lens motor $M_2$ for moving the photographing optical system for focusing and for changing over of the photographing mode of the camera in a direction along its optical axis. The motor driving circuit MD may be of a known construction in the form of a bridge circuit including 6 transistors, and accordingly detailed description thereof is omitted herein. It is to be noted that a film is wound by forward rotation of the film feeding motor $M_1$ and is rewound by reverse rotation of the motor $M_1$. Meanwhile, the photographing optical system is moved in the forward direction of the camera by forward rotation of the lens motor $M_2$ and is fed in the backward direction of the camera by reverse rotation of the motor $M_2$.

The electric circuit shown in FIG. 1 further includes an encoder EN which delivers pulses to a terminal ENC of the microcomputer CPU so that the microcomputer CPU may detect that the photographing optical system is actuated to a focused position. A lens stop electromagnet 17 is provided for controlling, in response to a signal from a terminal LMg of the microcomputer CPU, a stop lever to stop a photographing optical system moving member in order to stop the lens at a focused position or at an initial position with certainty. Detailed construction of the encoder EN, the photographing optical system moving member and so on will be hereinafter described.

The electric circuit shown in FIG. 1 further includes several switches. In particular, a main switch $S_{0-1}$ is connected in series to a parallel circuit of the light and distance measuring switch $S_1$, a release switch $S_2$ and the photographing mode change-over switch $S_{S/T}$ and presents an on state when the lens cover is open but presents an off state when the lens cover is closed so that shutter release and so on may be inhibited when the lens cover is closed. The switch $S_{0-2}$ presents an on state instantaneously when the lens cover is opened or closed as described hereinabove. In response to a signal from the switch $S_{0-2}$, the microcomputer CPU controls a boosting circuit D-D to start a boosting operation to make preparations for a subsequent photographing operation or controls the main lens to be retracted into the camera body when the lens cover is closed in the tele-photographing mode of the camera in which the main lens is projected from the camera body. The light and distance measuring switch $S_1$ is turned on when the release button is depressed to the first position as described hereinabove, and when the switch $S_1$ is on, operation of the light measuring circuit LM, distance measuring circuit DM, battery checking circuit BC, AE timer circuit AT, comparator CO and electromagnet 17 is enabled. The release switch $S_2$ is turned on when the release button is depressed to a second position farther than the first position, and when the switch $S_2$ is turned on, an exposure controlling operation of the camera is started. The photographing mode change-over switch $S_{S/T}$ is formed as a push button switch, and each time the switch $S_{S/T}$ is turned on, the photographing mode of the camera is changed over alternately from the standard photographing mode to the tele-photographing mode and from the tele-graphing mode to standard photographing mode. A one frame switch $S_5$ is turned on when the film feeding motor $M_1$ is rotated by a predetermined angle and is turned off when winding of a film by a distance for one frame is completed. A counter switch $S_8$ is connected in parallel to the one frame switch $S_5$ and keeps an on state till a time just before a sequential film counter of the camera is turned to indicate "1" from a condition in which it indicates "S" but presents an off state when the sequential film counter is in any other condition. A switch $S_6$ is provided for detecting a position of the photographing optical system and presents an on state when the photographing optical system stays at its initial position in which it is focused at an infinitely remote point in either of the standard and tele-photographing modes of the camera or when the photographing optical system reaches a final position advanced farther than a position in which it is focused at a minimum distance point. The switch $S_6$ presents an on state in any other condition of the photographing optical system. The switch $S_p$ is provided for discriminating a photographing mode of the camera and presents an off state in response to the standard photographing mode and an on state in response to the tele-photographing mode. The switches $S_6$ and $S_p$ are provided on the photographing optical system moving member together with the encoder EN mentioned hereinabove, but details thereof will be hereinafter described. A film detecting switch $S_4$ is provided at an upper portion of an exposure frame of the camera and presents an on state when a film is loaded in position in the camera and an off state when no film is loaded. The film detecting switch $S_4$ is connected to a terminal INTL of the microcomputer CPU via a one-shot circuit $OC_3$. A switch $S_7$ is connected in series to the film detecting switch $S_4$ and presents an on state when a rear lid of the camera is closed and an off state when the rear lid is open. A switch $S_9$ is provided for detecting that the camera is in a film rewinding condition. The switch $S_9$ is provided on a gear of a rewinding mechanism and is turned on when rewinding is started and turned off when the rear lid is opened. Thus, during rewinding, a signal "L" is received at a terminal RW of the microcomputer CPU. The switch DX is provided for transmitting ISO sensitivity information of a film to the light measuring circuit LM and the microcomputer CPU as described hereinabove, and when the switch DX is on, the light measuring circuit LM and the microcomputer CPU determine that the film sensitivity is ISO 400 but they determine that the film sensitivity is ISO 100 when the switch DX is off.

Finally, the on-off states of the switches are indicated in summary in Table 2 below.

TABLE 2

| Switch | On or Off State |
|---|---|
| $S_{0-1}$ | on when lens cover is open |
| $S_{0-2}$ | instantaneously turned on when lens cover is opened or closed |
| $S_1$ | on when release button is depressed to first position |
| $S_2$ | on when release button is depressed to |

TABLE 2-continued

| Switch | On or Off State |
|---|---|
| | second position |
| $S_4$ | on when film is loaded |
| $S_5$ | off when winding of film is completed |
| $S_6$ | off when lens is at initial or final position |
| $S_7$ | on when rear lid is closed |
| $S_8$ | on till a time just when counter is turned to indicate "1" from its "S" indicating condition |
| $S_9$ | on during rewinding, and turned off when rear lid is opened |
| $S_{S/T}$ | on when photographing mode change-over button is depressed |
| $S_p$ | on in tele-photographing mode |
| DX | ISO 400 is determined when on, and ISO 100 is determined when off |

Now, a flash circuit FI will be described. The flash circuit FI has a similar construction to that of a known flash circuit except that it includes 3 voltage detecting circuits $VD_1$, $VD_2$ and $VD_3$. Therefore, description will be given only of the voltage detecting circuits $VD_1$, $VD_2$ and $VD_3$ herein.

Figure 2:
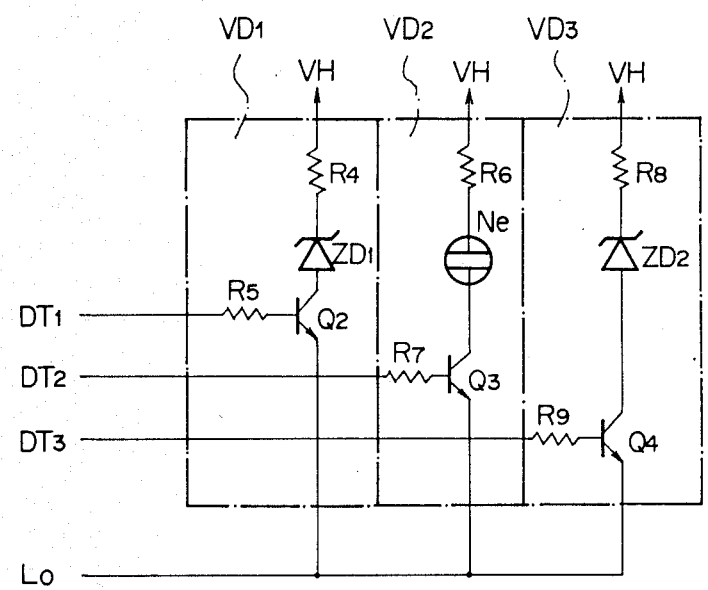
FIG. 2 is a circuit diagram showing an example of voltage detecting circuitry.

The first, second the third voltage detecting circuits $VD_1$, $VD_2$ and $VD_3$ are provided for detecting whether a charged voltage of a main capacitor $C_2$ reaches a first voltage (200 volts), a second voltage (265 volts) and a third voltage (295 volts), respectively. The voltage detecting circuits $VD_1$, $VD_2$ and $VD_3$ have such known constructions as shown in FIG. 2. Referring to FIG. 2, the first and third voltage detecting circuits $VD_1$ and $VD_3$ each includes two resistors $R_4$ and $R_5$ or $R_8$ and $R_9$, a Zener diode $ZD_1$ and $ZD_2$ and an npn transistor $Q_2$ or $Q_4$ while the second voltage detecting circuit $VD_2$ includes two resistors $R_6$ and $R_7$, as neon tube Ne and an npn transistor $Q_3$. The base terminals of the transistors $Q_2$, $Q_3$ and $Q_4$ are connected to terminals DT1, DT2 and DT3 of the microcomputer CPU via the resistors $R_5$, $R_7$ and $R_9$, respectively, so that the transistors $Q_2$, $Q_3$ and $Q_4$ are turned on by a signal "H" from the terminals DT1, DT2 and DT3, respectively, in order that one of the voltage detecting circuits $VD_1$, $VD_2$ and $VD_3$ may be selected. The emitter terminals of the transistors $Q_2$, $Q_3$ and $Q_4$ are connected in common to a terminal $L_0$ of the microcomputer CPU, and the microcomputer CPU thus detects whether or not the main capacitor $C_2$ has been charged up to a preset voltage by the boosting circuit D-D depending upon whether or not electric current flows out from the terminal $L_0$ thereof.

It is to be noted that the first voltage (200 volts) to be detected by the first voltage detecting circuit $VD_1$ is a voltage required to drive the piezoelectric element to open the shutter and the second voltage (265 volts) to be detected by the second voltage detecting circuit $VD_2$ is a voltage required to drive the piezoelectric element and cause the flash device to emit light. Meanwhile, the third voltage detecting circuit $VD_3$ is provided for causing the microcomputer CPU to stop a boosting operation of the boosting circuit D-D. In particular, if a signal "H" is received at the terminal $L_0$ of the microcomputer CPU when the third voltage detecting circuit $VD_3$ is selected, the microcomputer CPU delivers a signal "L" from a terminal FC thereof to cause the boosting circuit D-D to stop its boosting operation. It is a matter of course that it is possible to use a neon tube in place of the Zener diode $ZD_1$ or $ZD_3$ in the first or third voltage detecting circuit $VD_1$ or $VD_3$ or to use a Zener diode in place of the neon tube Ne in the second voltage detecting circuit $VD_2$.

Thus, the boosting circuit D-D performs a boosting operation to charge the main capacitor $C_2$ via a diode DI only while a signal "H" continues to be delivered from the terminal FC of the microcomputer CPU. A flash light emitting device FL emits light in synchronism with a trigger signal transmitted from a terminal TR of the microcomputer CPU.

Now, the photographing optical system PS, a finder optical system FS and actuating mechanisms for them will be described, and then focusing operation and photographing mode changing over operation will be described.

Figure 3:
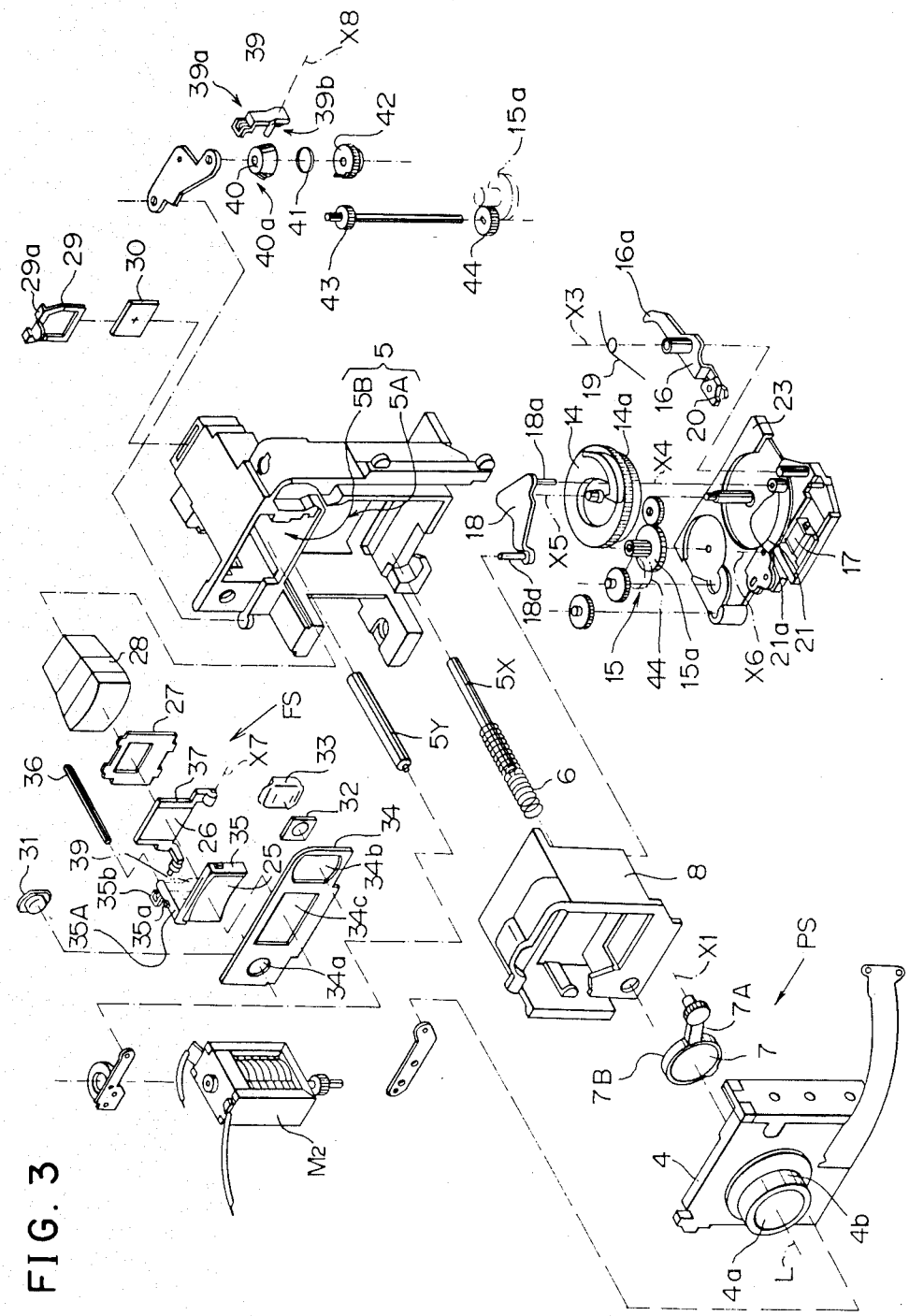
FIG. 3 is a fragmentary perspective view showing a photographing optical system, a finder optical system and actuating mechanism for the optical systems of the camera embodying the present invention.

Referring to FIG. 3, general construction of the finder optical system FS and the photographing optical system PS is shown. The photographing optical system PS includes a unitary shutter block 4 including a main lens 4a which is used both for standard photographing and tele-photographing and serves as a front lens set, a main lens frame 4b which carries the main lens 4a thereon, and a shutter not shown assembled in the main lens frame 4b. The shutter block 4 is supported for sliding movement in a direction along an optical axis L of the photographing optical system PS by means of a pair of shafts 5X and 5Y securely mounted on a fixed base plate 5 and is normally urged in the forward direction by a spring 6.

An auxiliary lens 7 is installed in the shutter block 4 and supported on a support lever 7A mounted for pivotal motion around an axis $X_1$ parallel to the optical axis L. The auxiliary lens 7 is interposed in a path of photographing light only in the tele-photographing mode of the camera. The fixed base plate 5 is integrally molded in such a manner as to cover the auxiliary lens 7 and includes a lower half section 5A and an upper half section 5B. The lower half section 5A has a tubular configuration and serves as a first mounting frame in which a movable lens barrel 8 securely mounted on the shutter block 4 is fitted for sliding movement. The movable lens barrel 8 and the shutter block 4 are thus supported for sliding movement and urged forwardly by the spring 6 in the fixed base plate 5.

As seen in FIG. 3, the lens motor $M_2$ is installed at a side portion of the fixed base plate 5. A gear base plate 23 is located below the lower half 5A of the fixed base plate 5 and fastened to the fixed base plate 5 by means of a screw not shown.

The actuating mechanism for the photographing optical system PS is installed on the gear base plate 23 and includes an advancing cam 14 mounted for rotation around an axis $X_5$, a gear train 15 for transmitting a rotational driving force fromm the motor $M_2$ to the rotatable advancing cam 14, a stop lever 16 having a pawl 16a for engaging with a ratchet portion 14a of an outer periphery of the advancing cam 14, a lens stopping electromagnet 17 for controlling operation of the stop lever 16, an advancing lever 18 serving as a cam follower of the advancing cam 14 on the photographing optical system PS side, and so on. The stop lever 16 is mounted for pivotal motion around an axis $X_3$ and normally urged in the counterclockwise direction in FIG. 3, that is, in a direction to engage the pawl 16a thereof with the ratchet portion 14a of the advancing cam 14 by means of a spring 19. An iron piece 20 to be attracted by the magnet 17 is mounted at the other end of the stop lever 16 remote from the pawl 16a with respect to the mounting axis $X_3$.

Thus, if the electromagnet 17 is energized to attract the iron piece 20 thereto, the pawl 16a of the stop lever 16 is disengaged from the ratchet portion 14a of the advancing cam 14 to allow rotation of the advancing cam 14 in the counterclockwise direction in FIG. 3. On the contrary, if the electromagnet 17 is deenergized, the stop lever 16 is pivoted in the counterclockwise direction in FIG. 3 by the urging force of the spring 19 to engage the pawl 16a thereof with the ratchet portion 14a of the advancing cam 14 thereby to inhibit rotation of the advancing cam 14 in the clockwise direction in FIG. 3.

Figure 4:
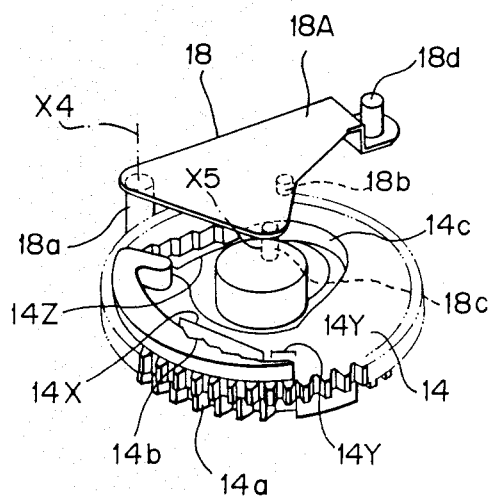
FIG. 4 is a perspective view of the actuating mechanism for moving the photographing optical system of FIG. 3.

Referring also to FIG. 4, the advancing lever 18 has first, second and third pins 18a, 18b and 18c implanted on a lower face thereof. The first pin 18a of the advancing lever 18 is received for pivotal motion in a pivotally supporting portion 21a of a support lever 21, and accordingly the advancing lever 18 is supported for pivotal motion around an axis $X_4$ provided by the first pin 18a. The advancing lever 18 further has a fourth pin 18d implanted on an upper face at a free end portion thereof.

The second and third pins 18b and 18c of the advancing lever 18 are individually located for engagement with a pair of first and second cam faces 14b and 14c, respectively, formed on an inner periphery of the advancing cam 14. Meanwhile, the fourth pin 18d is held in engagement with an elongated hole 8a (refer to FIG. 10a) formed in a bottom wall of the movable lens barrel 8 and extending in a direction perpendicular to the optical axis L.

In particular, the advancing lever 18 is constituted such that the second or third pin 18b or 18c thereof is engaged with a corresponding one of the pair of cam faces 14b and 14c of the advancing cam 14 to maintain the advancing lever 18 in a predetermined posture so that the fourth pin 18d thereof which is held in engagement with the movable lens barrel 8 serving as a carrying frame for the photographing optical system PS may control movement of the shutter block 4 urged forwardly by the spring 6 to effect positioning of the shutter block 4. Operation of the advancing lever 18 will be hereinafter described.

As described hereinabove, in the tele-photographing mode of the camera, the main lens frame 4b on which the main lens 4a mounted on the shutter block 4 and serving as a front lens set of the photographing optical system PS is carried is in a projected position in which it is projected from the camera body. In this condition, positioning of the shutter block 4 is attained by the spring 6 which urges the shutter block forwardly together with the main lens 4a and the mechanism for slidably moving the main lens 4a toward its retracted position against the urging force of the spring 6, that is, the actuating mechanism which includes the motor $M_2$, gear train 15, advancing cam 14 and advancing lever 18.

Figure 5:
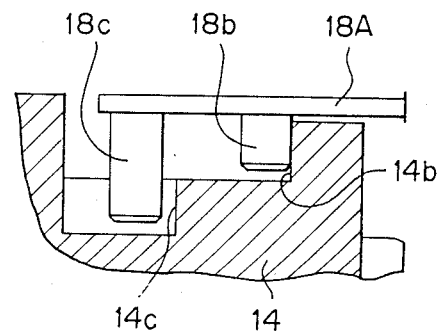
FIG. 5 is a partial cross sectional view of the actuating mechanism of FIG. 4.

Further, between the advancing cam 14 serving as an actuating side member of the actuating mechanism and the advancing lever 18 serving as an actuated side member, rocking motion of the advancing lever 18 toward its retracted position is allowed because the pair of pins 18b and 18c of the advancing lever 18 are engaged from the same side with the pair of cam faces 14b and 14c of the advancing cam 14 as seen in FIG. 5. Accordingly, even if an external force is applied, in the tele-photographing mode of the camera, to the shutter block 4 on which the main lens 4a is carried, for example, even if the camera is placed with the shutter block 4 positioned on the lower side, such an external force will be absorbed by the spring 6 because the rocking lever 18 will move away from the advancing cam 14. Accordingly, the actuating mechanism is prevented from receiving application of an excessively great force thereto, and damage to the operating mechanism can be minimized.

While details will be described in the description of operation hereinbelow, as the motor $M_2$ rotates forwardly or reversely, the advancing cam 14 is rotated in the forward or reverse direction to correspondingly change the posture of the advancing lever 18 to position the shutter block 4 via the movable lens barrel 8 in order to effect movement of the main lens 4a in a direction along the optical axis L and shifting movement of the auxiliary lens 7 into or out of the photographing light path.

Further, by driving rotation of the motor $M_2$, changing over of the focal length between a standard photographing mode and a tele-photographing mode is performed, and by driving rotation of the same motor $M_2$ to move the main lens 4a in either of the two photographing modes of the camera, a focusing operation is performed.

In particular, the actuating mechanism for sequentially performing changing over between ranges of the focal length of the photographing optical system PS and focusing of the photographing optical system PS in the thus changed focal length range is constituted from the gear train 15, advancing cam 14, advancing lever 18, stop lever 16, electromagnet 17, motor $M_2$ and so on.

In this instance, since the shutter block 4 is urged in the forward direction and positioning of the shutter block 4 is attained by the advancing lever 18 having the pair of pins 18b and 18c which engage with the pair of cam faces 14b and 14c, respectively, of the advancing cam 14, the inclined angles of the cam faces 14b and 14c relative to the tangential directions to a rotational locus of the advancing cam 14, that is, the operating directions of the cam 14, can be formed in compliance with a required speed of movement of the shutter block 4 (a relative moving speed such as, for example, a speed higher for focusing operation in the tele-photographing mode of the camera than that for focusing operation in the standard photographing mode, or a speed higher for changing over operation of between the focal length ranges than that for focusing operation) while the advancing cam 14 is rotated at a constant speed. Accordingly, a focal length changing over operation upon photographing can be performed rapidly, and a focusing operation can be performed with a high degree of accuracy.

The first cam face 14b of the advancing cam 14 and the second pin 18b of the operating lever 18 which engages with the first cam face 14b are designed so as to provide a focusing operation of the photographing optical system PS in the standard photographing mode of the camera and a front half of a changing over operation in focal length range from the standard photographing mode to the tele-photographing mode of the camera.

Meanwhile, the second cam face 14c of the advancing cam 14 and the third pin 18c of the operating lever 18 which engages with the second cam face 14c are designed so as to provide a rear half of a changing over operation in focal length range from the standard photographing mode to the tele-photographing mode of the camera and a focusing operation of the photographing optical system PS in the tele-photographing mode of the camera.

In particular, the first cam face 14b of the advancing cam 14 includes a focusing cam face 14X on the short focal length range side and a half of a focal length change-over cam face 14Y while the second cam face 14c includes the other half of the focal length change-over cam face 14Y and a focusing cam face 14Z on the long focal length range side.

The short focal length side focusing cam face 14X, the focal length change-over cam face 14Y and the long focal length side focusing cam face 14A are formed in a row in the direction of rotation of the advancing cam 14 of the rotational type, that is, in the operating direction of the cam 14.

As the first cam face 14b and the second cam face 14c are formed separately in this manner, error in operation of the advancing lever 18 serving as a cam follower of the advancing cam 14 can be minimized.

In particular, if the first and second cam faces 14b and 14c are otherwise formed as a unitary cam face, then one end of the unitary cam face will be formed at a location near the rotational axis $X_5$ of the advancing cam 14. In this case, the length of the cam face in the circumferential direction relative to a predetermined rotational angle of the advancing cam 14 will be relatively small. Then, a portion of the cam face formed near the rotational axis $X_5$ of the advancing cam 14 will provide a great error in the circumferential direction relative to a same error in rotational angle comparing with another portion of the cam face formed near the outer periphery of the advancing cam 14. Therefore, the error in operation of the advancing lever 18 serving as a cam follower of the advancing cam 14 will be increased accordingly.

To the contrary, where the cam faces are formed separately as described hereinabove such that they may operate sequentially in a single operation of the cam, they can be formed all at portions near the outer periphery of the advancing cam 14 and accordingly error in operation can be minimized.

Further, the first and second cam faces 14b and 14c making divided peripheral face sections of the advancing cam 14 of the rotational type as differentiated in depth from the top face of the advancing cam 14, that is, differentiated in position in the direction of the rotational axis $X_5$ of the advancing cam 14. In a corresponding relationship, the pair of pins 18b and 18c provided on the advancing lever 18 which serves as a cam follower and serving as cam follower elements of the pair of divided circumferential faces 14b and 14c, respectively, are differentiated in extent in projection of the operating lever 18 from a base plate 18A of the operating lever 18.

In short, with the construction wherein the cam faces 14b and 14c of the advancing cam 14 of the rotational type are formed separately in two stages which are displaced from each other in a direction along the rotational axis $X_5$ of the advancing cam 14, both of the cam faces 14b and 14c can be designed so that they may have a great displacing width with respect to a radial direction of the advancing cam 14. Accordingly, the two cam faces 14b and 14c for controlling movement of the shutter block 4 can be designed such that they may have a great rotational angle with respect to the rotational axis $X_5$ of the advancing cam 14 comparing with an amount of linear movement of the shutter block 4. Accordingly, reduction in error in operation can be anticipated.

Further, the focusing cam faces 14X and 14Z of the pair of cam faces 14b and 14c of the advancing cam 14 are each formed from several cylindrical faces having different distances from the rotational axis $X_5$ of the advancing cam 14 and connected in series by inclined faces. The inclined faces make operating areas which cause the operating lever 18 serving as a cam follower to operate for focusing while the cylindrical faces make non-operating areas. It is to be noted that the fourth pin 18d of the operating lever 18 serves as a focusing member for the photographing optical system PS.

Figure 6:
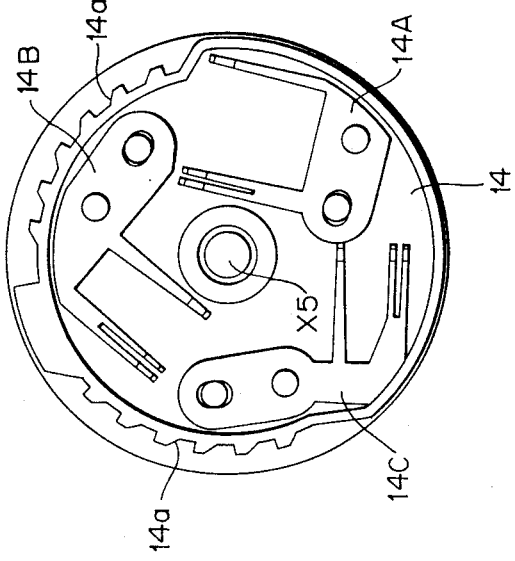
FIG. 6 is a bottom plan view of an advancing cam included in the actuating mechanism of FIG. 4.

Referring now to FIG. 6, the advancing cam 14 further has first, second and third position detecting brushes 14A, 14B and 14C provided at circumferentially different locations on a lower face thereof. Meanwhile, referring to FIG. 7, position detecting patterns and encoder patterns are formed on an upper face of the gear base plate 23 carried on the advancing cam 14 and serving as a stationary part. The position detecting patterns on the gear base plate 23 are provided for suitably contacting with the three position detecting brushes 14A, 14B and 14C of the advancing cam 14 to turn on or off the switches Sp and $S_6$ in response to a rotational position of the advancing cam 14 for detecting a photographing mode of the camera and a position of the photographing optical system PS.

The patterns are formed from up to 5 substantially concentrical arcuate terminals 23A to 23E centered at the rotational axis $X_5$ of the advancing cam 14.

The innermost arcuate terminal 23A and the fourth innermost actuate terminal 23D constitute, together with the second brush 14B, the switch $S_6$ for detecting an initial position and a final position of the photographing optical system PS in either of the two photographing modes including the standard photographing mode and the tele-photographing mode. When the photographing optical system PS is either at the initial position or at the final position, one end of the second brush 14B is located at one of non-conducting portions 23w, 23x and 23y on the same circumferential line with the arcuate terminal 23D so that the switch $S_6$ assumes an off position. The initial and final positions of the photographing optical system PS will be hereinafter described.

Meanwhile, the third innermost arcuate terminal 23C and radially projected portions of the fourth and fifth innermost arcuate terminals 23D and 23E constitute, together with the third brush 14C, the encoder EN for detecting an amount of movement of the shutter block 4 in either of the two photographing modes of the camera including the standard photographing mode and the tele-photographing mode. The encoder EN is successively turned on and off to product pulse signals (refer to FIG. 12) in response to rotation of the advancing cam 14 for moving the shutter block 4. The microcomputer CPU thus receives and counts such pulse signals in order to detect a current position of the shutter block 4.

Further, the second innermost arcuate terminal 23B and the outermost arcuate terminal 23E constitute, together with the first brush 14A, the switch Sp for detecting whether the photographing optical system PS is positioned within the range of the standard photographing mode of the camera or within the other range of the tele-photographing mode. When the photographing optical system PS is positioned within the range of the standard photographing mode, one end of the first brush 14A contacts with a non-conducting portion 23z on the same circumferential line with the arcuate terminal 23B so that the switch Sp assumes an off position.

It is to be noted that the first, second and third brushes 14A, 14B and 14C are always held in contact with the arcuate terminals 23E, 23A and 23C, respectively.

Figure 8:
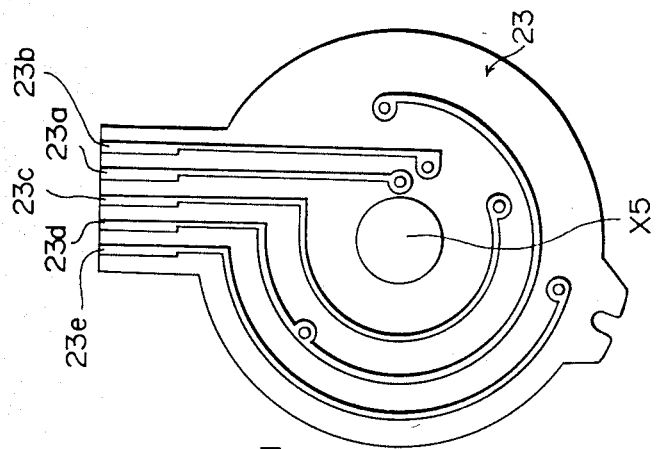
FIG. 8 is a bottom plan view of the base plate of FIG. 7.

Referring to FIG. 8, connecting terminals 23a to 23e are provided on a bottom face of and exposed outside the gear base plate 23 and connected via through-holes to the arcuate terminals 23A to 23E, respectively. The terminal 23d is connected to the power supply line VL, and the terminal 23e is connected to the ground line.

Figure 9:
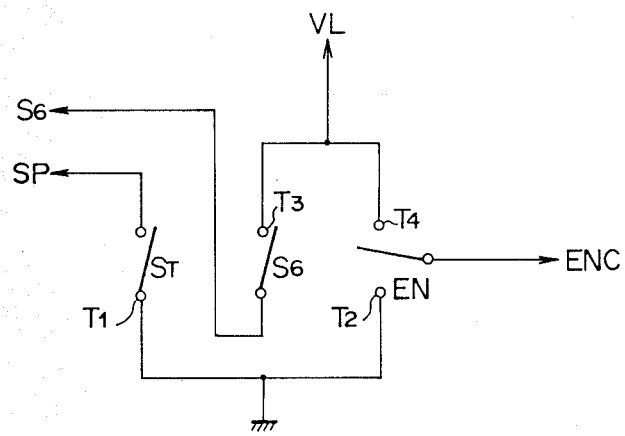
FIG. 9 is a circuit diagram showing, in diagrammatic representation, switches and an encoder for detecting a position of the photographing optical system of FIG. 3.

Referring now FIG. 9, the switches Sp and $S_6$ and the encoder EN are shown in a diagrammatic representation. It is to be noted that reference symbols S6, SP and ENC in FIG. 9 denote corresponding terminals of the microcomputer CPU, respectively.

Figure 7:
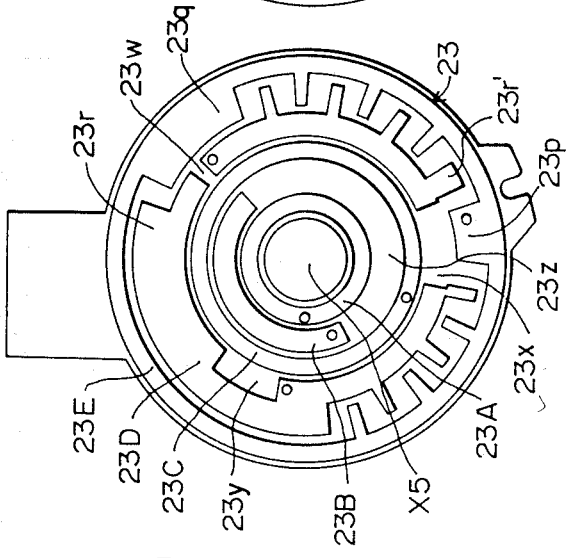
FIG. 7 is a top plan view of a base plate for supporting the actuating mechanism of FIG. 4 thereon.

By the way, if it is attempted to constitute the two switches and the encoder which each delivers three discrete signals of "H", "L" and "open" from opening and closing switches, then up to 7 terminals (represented by round circles in FIG. 9) are required as apparently seen in FIG. 9. To the contrary, where the switches and the encoder are constituted from conducting patterns and brushes which are disposed in a spaced relationship from each other in their sliding direction as in the present embodiment, a plurality of contacts can be provided by a single pattern, and accordingly the quantity of terminals can be reduced. More in particular, by forming the switches from the such brushes and patterns as shown in FIGS. 6 and 7 and by replacing two terminals $T_1$ and $T_2$ and another two terminals $T_3$ and $T_4$ of FIG. 9 with the single patterns 23E and 23D, respectively, the five arcuate terminals 23A to 23E as shown in FIG. 7 can act in the same manner as the seven terminals in FIG. 9.

Now, operating of the member for moving the photographing optical system PS, that is, the advancing cam 14, and relations of positions of the photographing optical system PS to on-off states of the switches $S_6$ and Sp and output of the encoder EN will be described with reference to FIGS. 10a to 12.

Figure 10A:
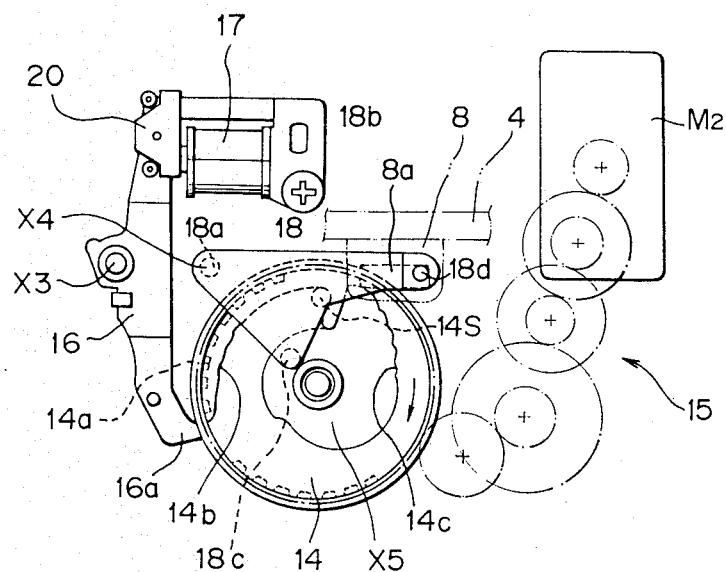
FIGS. 10a to 10e are plan views illustrating different stages of operation of the actuating mechanism for moving the photographing optical system of FIG. 3.

At first, a focusing operation in the standard photographing mode of the camera will be described. When the photographing optical system PS which is here constituted only from the main lens 4a is positioned at its initial position in the standard photographing mode of the camera, the pawl 16a of the stop lever 16 is held in engagement with a portion of an outer periphery of the advancing cam 14 other than the ratchet portion 14a as seen in FIG. 10a. Meanwhile, the iron piece 20 is held in contact with the electromagnet 17.

Further, the second pin 18b of the advancing lever 18 is held in contact with a starting end portion of the first cam face 14b of the advancing cam 14, thereby positioning the shutter block 4 against the urging force acting in the forward direction along the optical axis L (in the upward direction in FIG. 10a). To the contrary, the third pin 18c of the advancing lever 18 is held out of engagement with the second cam face 14c of the advancing cam 14.

In this condition, one ends of the first and second brushes 14A and 14B engages with the non-conducting portions 23z and 23y of the gear base plate 23, respectively, as shown in FIG. 11a while one end of the third brush 14C contacts with an inwardly projected portion 23p of the arcuate terminal 23E. Accordingly, the switches Sp and S₆ are both off while the output signal of the encoder EN is "L".

Here, if the release button is depressed to the second position to turn the switch S₂ on as hereinafter described, the lens motor M₂ starts its forward rotation, that is, its rotation in the counterclockwise direction in FIG. 10a. Consequently, the advancing cam 14 starts rotation in the clockwise direction in FIG. 10a via the gear train 15 so that the one end of the second brush 14B is soon contacted with the circular terminal 23D thereby to turn the switch S₆ on (refer to FIG. 11b).

As the advancing cam 14 is rotated in this manner, the second pin 18b of the advancing lever 18 moves along the first cam face 14b of the advancing cam 14 to pivot the advancing lever 18 in the counterclockwise direction around the axis X₄. Consequently, the shutter block 4 is advanced in the forward direction along the optical axis L by the urging force of the spring 6.

It is to be noted that if the release button is depressed to turn the switch S₁ on, the electromagnet 17 is rendered operative after a predetermined interval of time after then so that the iron piece 20 is attracted to the electromagnet 17 to allow rotation of the advancing cam 14 in the clockwise direction in FIG. 10a as hereinafter described.

During rotation of the advancing cam 14, the one end of the third brush 14C is successively engaged with radially outwardly and inwardly projected portions of the arcuate terminals 23D and 23E so that the encoder EN alternately delivers signals "H" and "L" with an open state interposed between each adjacent signals. At the point of time when the encoder EN first delivers a signal "H", the lens is focused in the sixth zone (refer to Table 1 hereinabove), and then when a subsequent signal "L" is delivered, the lens is focused in the fifth zone. Similarly, each time a signal "H" or "L" is delivered, the lens is focused successively in the fourth, third, second and first zones.

It is to be noted that, as hereinafter described, when an object exists in the nearmost zone (0th zone), the flash device is caused to emit flash light even if the object is sufficiently bright and accordingly there is no necessity of causing the flash device to emit light while the aperture is stopped down to a value lower than usual to increase the depth of field so that the object in the 0th zone may be in focus even if the lens is focused to the first zone. With the construction, the number of cylindrical faces constituting the cam faces 14X and 14Z of the advancing cam 14 can be reduced, and accordingly production of the advancing cam 14 is simplified.

Further, if the depth of field is increased in the nearmost zone (0th zone), out of focus conditions can be reduced even in short distance photographing.

When a zone represented by measured distance data (D₂, D₁, D₀) from the distance measuring circuit DM coincides with a zone calculated from pulses from the encoder EN, rotation of the lens motor M₂ is stopped and the electromagnet 17 is deenergized so that the stop lever 16 is pivoted in the counterclockwise direction around the axis X₃ as shown in FIG. 10b by the urging force of the spring 19 to engage the pawl 16a thereof with the ratchet portion 14a of the advancing cam 14 to effect positioning of the advancing cam 14.

By the way, if a zone represented by measured distance data do not coincide with a zone calculated from pulses from the encoder EN due to some trouble, the advancing cam 14 will continue its rotation even after the nearmost zone is reached, and then only after the one end of the second brush 14B is contacted with the non-conducting portion 23w and the one end of the third brush 14C is contacted with a radially outwardly projected portion 23r of the actuate terminal 23D to turn the switch S₆ off and change the output of the encoder EN into "H", such rotation of the advancing cam 14 and the motor M₂ is stopped. The final position of the photographing optical system PS in the standard photographing mode is defined in this manner.

The photographing optical system PS at its focused position or at its final position is returned to its initial position after an exposure operation. In particular, the motor M₂ starts rotation thereof in the clockwise direction in FIG. 10b. Consequently, the advancing cam 14 starts its rotation in the counterclockwise direction in FIG. 10b via the gear train 15 without being stopped by the stop lever 16. As the advancing cam 14 is rotated, the advancing lever 18 is pivoted in the clockwise direction to move the shutter block 4 and the movable lens barrel 8 in the rearward direction along the optical axis L.

When the advancing cam 14 reaches its initial position, the one end of the second brush 14B is contacted with the non-conducting portion 23y and the one end of the third brush 14C is contacted with a radially inwardly projected portion 23p of the arcuate terminal 23E so that the switch S₆ is turned on and the output of the encoder EN is changed into "L".

The microcomputer CPU detects this and thus causes the motor M₂ to stop its rotation. The photographing optical system PS is returned to its initial position as shown in FIG. 10a.

Now, a changing over operation from the standard photographing mode to the tele-photographing mode of the camera will be described. If the photographing mode change-over button is depressed to turn the switch $S_{S/T}$ on as hereinafter described in the initial condition of the standard photographing mode as shown in FIG. 10a, the electromagnet 17 is energized to attract the iron piece 20 thereto to allow rotation of the advancing cam 14 in the clockwise direction. At the same time, the lens motor M₂ is rotated in the counterclockwise direction to start rotation of the advancing cam 14 in the clockwise direction via the gear train 15 so that the switch S₆ is soon turned on.

As the advancing cam 14 is rotated in the clockwise direction, the advancing lever 18 of which the second pin 18b engages with the first cam face 14b of the advancing cam 14 is pivoted in the counterclockwise direction similarly as in the focusing operation in the standard photographing mode described hereinabove. Consequently, the shutter block 4 and the movable lens barrel 8 are moved forwardly along the optical axis L.

The first cam face 14b does not extend over the entire circumference of the advancing cam 14 so that it is disengaged from the first pin 18b of the advancing lever 18 when the advancing lever 18 is pivoted until the second pin 18b thereof moves farther than a final end 14t of the first cam face 14b as shown in FIG. 10c. Consequently, the advancing lever 18 is allowed to be further pivoted in the counterclockwise direction as it is drawn by the shutter block 4 which is urged in the forward direction along the optical axis L.

In this instance, the third pin 18c of the advancing lever 18 is held in contact with the second cam face 14c of the advancing cam 14, and as the advancing cam 14 is rotated in the clockwise direction after then, the third pin 18c of the advancing lever 18 moves along the second cam face 14c of the advancing cam 14 to control pivotal motion of the advancing lever 18.

Figure 10:
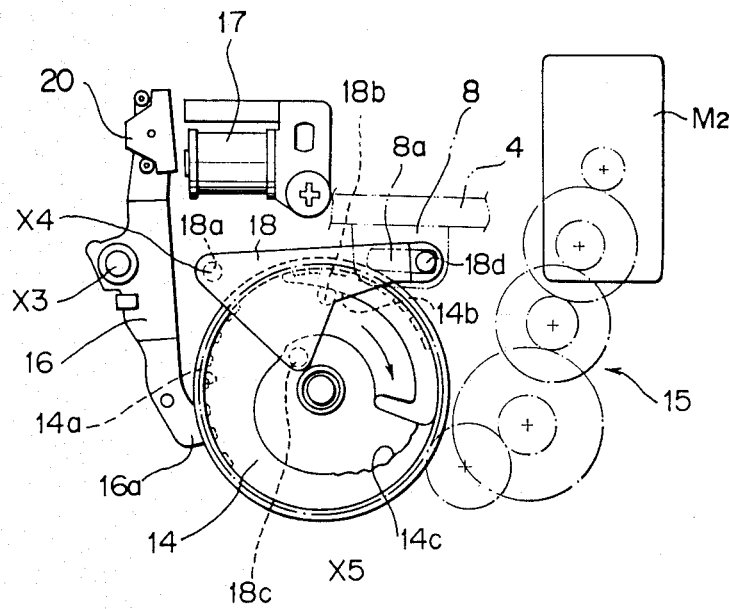
Figure 10:
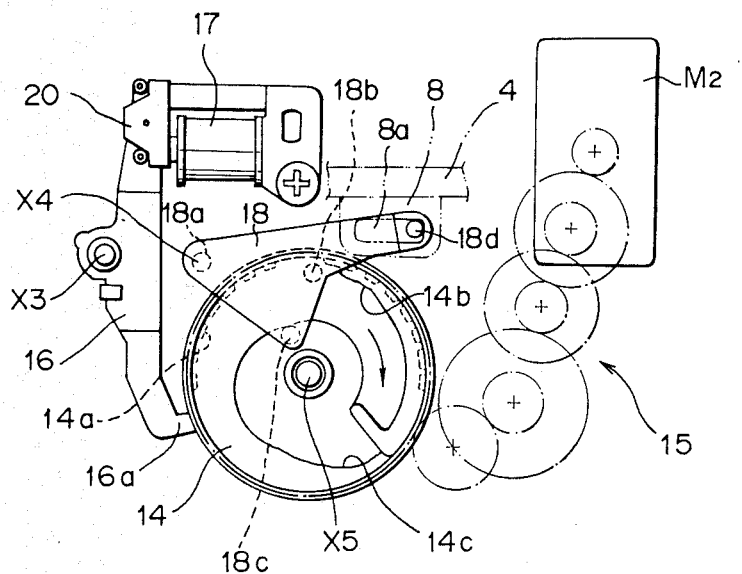
Figure 10D:
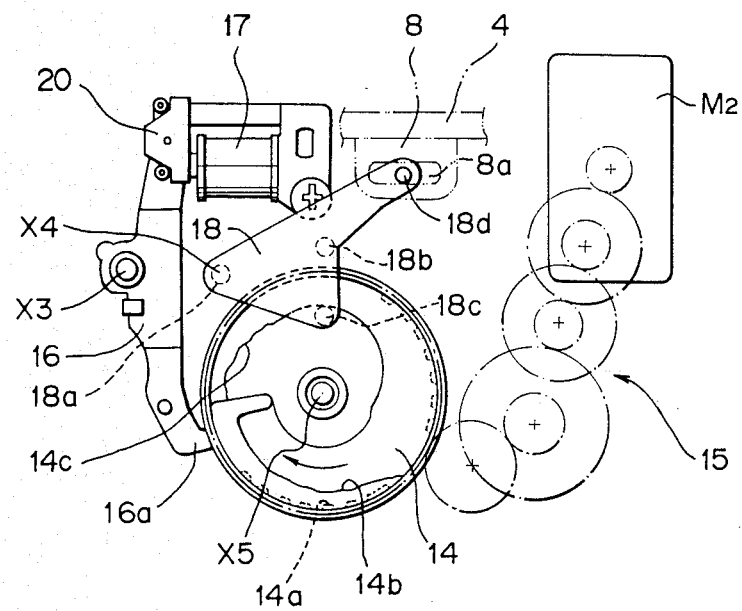

When the advancing cam 14 is rotated to a position corresponding to the tele-photographing range of the photographing optical system PS, the one end of the first brush 14A is contacted with the arcuate terminal 23B (refer to FIG. 11c) to turn the switch Sp on. After then, when the photographing optical system PS reaches its initial position in the tele-photographing mode of the camera, the one end of the second brush 14B is contacted with the non-conducting portion 23x while the one end of the third brush 14C is contacted with a radially inwardly projected portion 23q of the arcuate terminal 23E. Consequently, the switch $S_6$ is turned off and the output of the encoder EN is changed into "L". The microcomputer CPU detects this and thus controls to stop rotation of the motor $M_2$ and deenergize the electromagnet 17. Consequently, the stop lever 16 is pivoted in the counterclockwise direction around the axis $X_3$ by the urging force of the spring 19 to engage the pawl 16a thereof with the ratchet portion 14a of the advancing cam 14 until its initial position in the tele-photographing mode shown in FIGS. 10d and 11d is reached.

It is to be noted that, upon such changing over, the auxiliary lens 7 is inserted into the photographing light path by a mechanism not shown.

By the way, even if the final position in the standard photographing mode (refer to FIG. 11f) is reached in the course of such a changing over operation, the microcomputer CPU does not determine that the final position is an initial position in the tele-photographing mode because at the final position the output of the encoder EN presents "H" while the switch $S_6$ is off. This similarly applies to changing over from the tele-photographing mode to the standard photographing mode described hereinbelow.

Figure 12:
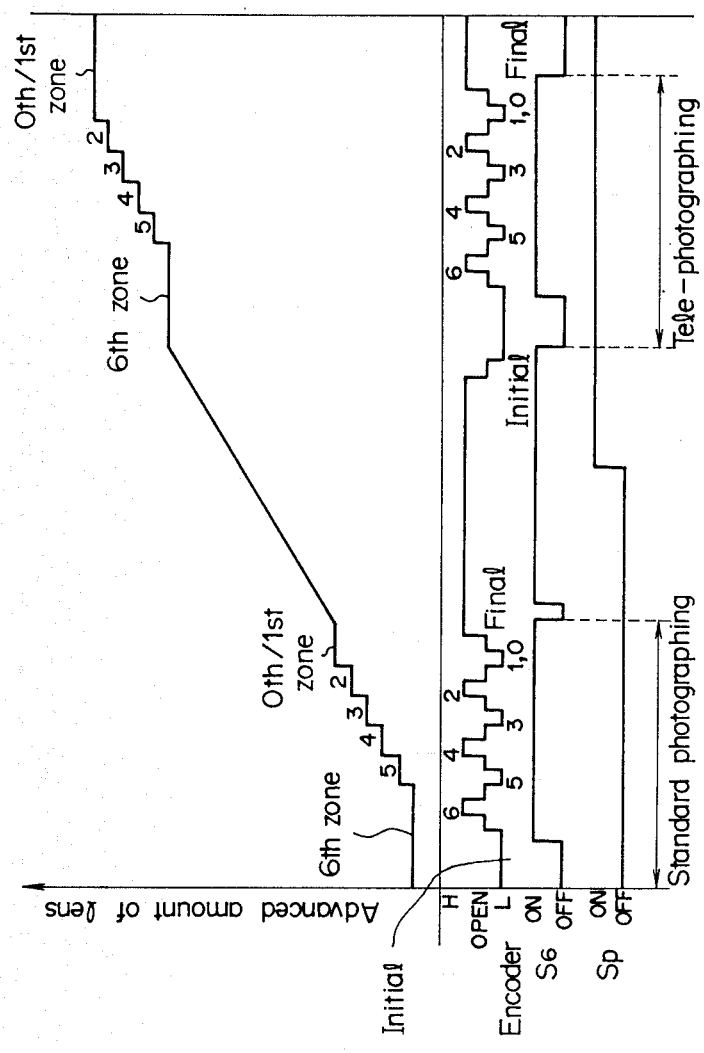
FIG. 12 is a graph illustrating relations of the switches and the encoder of FIG. 9 to the amount of advancement of the photographing optical system.

Meanwhile, since the one end of the third brush 14C remains in contact with the projected portion 23r of the arcuate terminal 23D within an area from a position just before the final position in the standard photographing mode to another position just before the initial position in the tele-photographing mode, the encoder EN maintains its output signal "H" as seen in FIG. 12.

Now, a changing over operation from the tele-photographing mode to the standard photographing mode will be described. If the photographing mode changeover button is depressed in the initial position of the tele-photographing mode as shown in FIG. 10d, the lens motor $M_2$ is rotated in the clockwise direction. As the motor $M_2$ is rotated, the advancing cam 14 is rotated in the counterclockwise direction via the gear train 15 without being stopped by the stop lever 16. Thereupon, the one ends of the second brush 14B, third brush 14C and first brush 14A are successively brought into contact with the actuate terminal 23D, the projected portion 23r of the arcuate terminal 23D and the non-conducting portion 23z, respectively. Consequently, the switch $S_6$ is turned on and the output of the encoder EN is changed into "H" while the switch Sp is turned off.

As the advancing cam 14 is rotated in the counterclockwise direction, the advancing lever 18 of which the third pin 18c contacts with the second cam face 14c of the advancing cam 14 is pivoted in the clockwise direction. Consequently, the shutter block 4 and the movable lens barrel 8 are moved in the rearward direction along the optical axis L.

In the course of the counterclockwise rotation of the advancing cam 14, the third pin 18c of the advancing lever 18 is brought into contact with the second cam face 14c of the advancing cam 14 as shown in FIG. 10c and the second pin 18b of the advancing lever 18 is brought into contact with the first cam face 14b of the advancing cam 14. Consequently, as the advancing cam 14 is rotated in the counterclockwise direction after then, the second pin 18b of the advancing lever 18 moves along the first cam face 14b of the advancing cam 14, thereby controlling pivotal motion of the advancing lever 18.

After then, when the switch $S_6$ is turned off and the output of the encoder EN is changed into "L" in a similar manner as in the focusing operation in the standard photographing mode, the microcomputer CPU controls to stop rotation of the lens motor $M_2$. Consequently, the initial position in the standard photographing mode as shown in FIG. 10a is assured.

It is to be noted that, upon such a changing over operation, the auxiliary lens 7 is retracted from the photographing light path by the mechanism not shown.

Now, a focusing operation in the tele-photographing mode of the camera will be described. When the photographing optical system PS which is now constituted from the main lens 4a and the auxiliary lens 7 is positioned at its initial position in the tele-photographing mode, the pawl 16a of the stop lever 16 is held in contact with a portion of the outer periphery of the cam face 14 other than the ratchet portion 14a is shown in FIG. 10d. Meanwhile, the iron piece 20 is held in contact with the electromagnet 17.

Further, the third pin 18c of the advancing lever 18 is held in contact with the second cam face 14c of the advancing cam 14 to position the shutter block 4 against the urging force acting in the forward direction along the optical axis L, that is, in the upward direction in FIG. 10d. To the contrary, the second pin 18b of the advancing lever 18 is held out of contact with the first cam 14b of the advancing cam 14.

In this condition, the one ends of the first, second and third brushes 14A, 14B and 14C of the advancing cam 14 are held in contact with the arcuate terminal 23A, the non-conducting portion 23x and a radially inwardly projected portion 23q of the arcuate terminal 23E of the gear base plate 23, respectively, as shown in FIG. 11d. Accordingly, the switch Sp is on while the switch $S_6$ is off and the output of the encoder EN is "L".

Figure 10E:
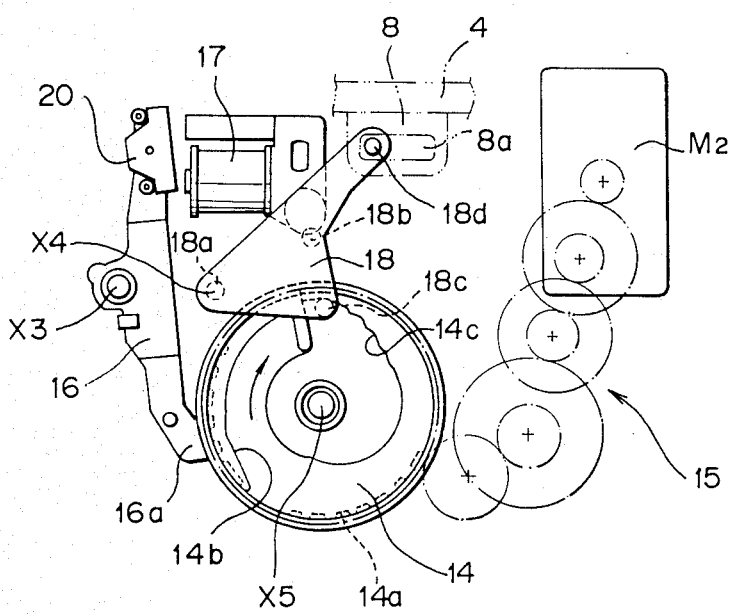

Here, if the release button is depressed to the second position to turn the switch $S_2$ on similarly as in the standard photographing mode, the lens motor $M_2$ starts its rotation in the counterclockwise direction. In this instance, since rotation of the advancing cam 14 in the clockwise direction is allowed as described hereinabove, rotation of the motor $M_2$ is transmitted to the advancing cam 14 via the gear train 15a so that the advancing cam 14 starts its rotation in the clockwise direction. Consequently, the switch $S_6$ is soon turned on (refer to FIGS. 10e and 11e).

As the advancing cam 14 is rotated, the third pin 18c of the advancing lever 18 moves along the second cam face 14c of the advancing cam 14 to pivot the advancing lever 14 around the axis $X_4$. Consequently, the shutter block 4 is moved in the forward direction along the optical axis L by the urging force of the spring 6.

After then, the photographing optical system PS is stopped either at a focused position (refer to FIGS. 10e and 11e) or at the final position in a similar manner as in the standard photographing mode. Then, after an exposure operation, the photographing optical system PS is returned to its initial position in the telephotographing mode as shown in FIG. 10d. However, at the final position in this case, the one ends of the second and third brushes 14B and 14C contact with the non-conducting portion 23y and a radially outwardly projected portion 23r' of the arcuate terminal 23D.

By the way, when the photographing optical system PS is returned to its initial position in a focusing operation or changed over from the tele-photographing mode range to the standard photographing mode range, the lens stopping electromagnet 17 does not operate in the camera of the present embodiment. Accordingly, the advancing cam 14 is rotated in the clockwise direction while the stop lever 16 is successively flipped by teeth of the ratchet portion 14a of the advancing cam 14 against the urging force of the spring 19. However, this construction may be replaced by another construction wherein, also when the photographing optical system PS is to be returned to its initial position or is to be changed over from the telephotographing mode range to the standard photographing mode range, the electromagnet 17 is rendered operative to move the pawl 16a of the stop lever 16 away from the ratchet portion 14a of the advancing lever 14 in order to eliminate production of noises during rotation.

Referring back to FIG. 3, construction of the finder optical system FS will be described.

The finder optical system FS includes an objective lens 25, a magnification changing lens 26, a field frame 27, an eyepiece 28, a holding plate 29 and a frame plate 30 disposed in this order from forwardly in the direction of the optical axis L as shown in FIG. 3. The finder optical system FS is accommodated in the tubular upper half section 5B of the fixed base plate 5 serving as a second mounting frame.

As shown in FIG. 3, a near infrared light emitting element 31 constituting a light emitting means and a condensing lens 32 and a light receiving element 33 constituting a light receiving means for performing measurement of a distance in an active manner are provided in the upper half section 5B of the fixed base plate 5. A frame member 34 having a light emitting window 34a, a light receiving window 34b and a finder window 34c formed therein is fastened to the fixed base plate 5 in such a manner as to cover over locations forwardly of the light emitting means, the light receiving means and the finder optical system FS.

As shown in FIG. 3, an objective lens holder 35 on which the objective lens 25 of the finder optical system FS is held has a tubular poriton 35A extending in a direction along the optical axis L. The tubular portion 35A of the objective lens holder 35 is fitted around a guide shaft 36 securely mounted on the fixed base plate 5 so that the objective lens 25 may move in the direction of the optical axis L.

Meanwhile, a magnification changing lens holder 37 on which the magnification changing lens 26 is held is mounted for pivotal motion around an axis $X_7$ so that the magnification changing lens 26 may be moved into and out of a finder light path. A spring not shown is provided for urging, via the magnification changing lens holder 37, the magnification changing lens 26 to move into the finder light path.

The eyepiece 28 is positioned with an offset or stepped portion thereof not shown held in contact from forwardly with an offset or stepped portion not shown of the fixed base plate 5 and with a forward end thereof resiliently contacted with the field frame 27.

Futher, the frame plate 30 has a translucent plated frame formed thereon for visibly indicating a frame delineating a photographing range within the finder field. The frame plate 30 is positioned by being resiliently contacted from forwardly by the holding plate 29 and is stopped from being pulled off upwardly by being contacted from upwardly by a pair of bent lugs 29a of the holding plate 29.

An upper pin 35a and a side pin 35b are implanted on an upper portion and a side portion of the tubular portion 35A of the objective lens holder 35.

The side pin 35b of the objective lens holder 35 is fitted in a bifurcated portion 39a at the top end of a change-over operating lever 39. The change-over operating lever 39 is mounted for pivotal motion around an axis $X_8$, and as the change-over operating lever 39 is pivoted, the objective lens holder 35 is moved forwardly or backwardly.

The change-over operating lever 39 has a bevel gear portion 39b remote from the bifurcated poriton 39a with respect to the pivotal axis $X_8$. A bevel gear 40 is opposed to the bevel gear portion 39b of the change-over operating lever 39 and has a gear portion 40a having 2 teeth formed at part of a circumference thereof as shown in FIG. 3.

The bevel gear 40 is connected to a gear 42 by means of a spring 41 as shown in FIG. 3. Another gear 43 is held in meshing engagement with the gear 42 and has a further gear 44 which rotates in an integral relationship therewith and is held in meshing engagement with a gear 15a in the gear train 15 for transmitting a driving force from the lens motor $M_2$ to the advancing cam 14 serving as the photographing optical system moving member already described hereinabove.

Thus, as the motor $M_2$ rotates forwardly or reversely, the bevel gear 40 is rotated. The gear portion 40a of the bevel gear 40 is brought into meshing engagement with the bevel gear portion 39b of the change-over operating lever 39 only during changing over operation between the focal length ranges of the photographing optical system PS. Through such meshing engagement between the gear portion 40a and the bevel gear portion 39b, the change-over operating lever 39 is pivoted around the axis $X_8$ thereby to change over the magnification of the finder optical system FS.

Now, operation of the camera will be described with reference to flow charts shown in FIGS. 13 to 25.

Figure 13:
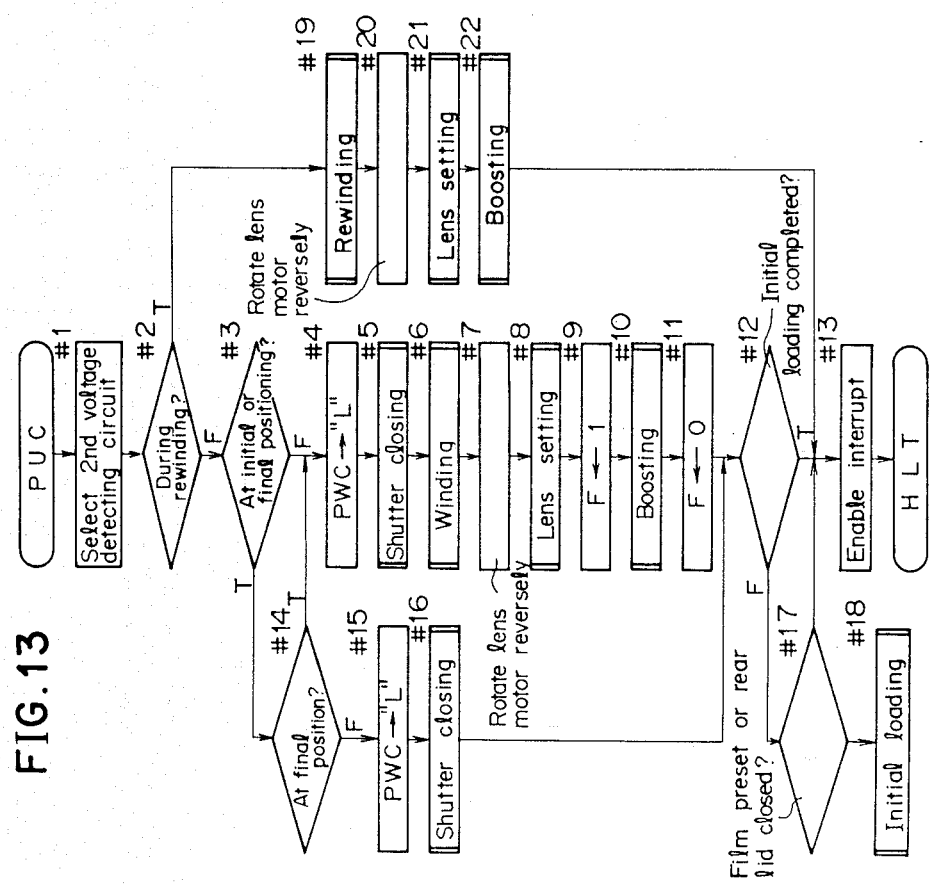

At first, initialization of the camera will be described with reference to FIG. 13. As already described, if power source batteries are loaded in position into the camera, a pulse is transmitted to the terminal PUC of the microcomputer CPU. Upon reception of the pulse, the microcomputer CPU starts its operation in accordance with the flow chart shown in FIG. 13. In particular, the microcomputer CPU outputs signals "L" at the terminals DT1 and DT3 thereof and a signal "H" at the terminal DT2 thereof to select the second voltage detecting circuit $VD_2$ at step #1. Then, the microcomputer CPU judges at step #2 whether or not a film is being rewound. In particular, if the switch $S_6$ is on and accordingly a signal "L" is received at the terminal RW, the microcomputer CPU determines that a film is being rewound and then continues rewinding of the film at step #19. By the way, when rewinding is proceeding, the photographing optical system PS is not yet returned to its initial position as hereinafter described. Therefore, after rewinding is completed, the lens motor $M_2$ is first rotated reversely at step #20 and then the photographing optical system PS is returned to its initial position at step #21 whereafter the main capacitor $C_2$ is charged at step #22 and then, at step #13, interruption is enabled so as to put the camera into a stand-by condition in which the camera can photograph at any time.

On the contrary, in case the microcomputer CPU determines at step #2 that rewinding is not proceeding, then the sequence advances to step #3. At step #3, the microcomputer CPU determines from the on-off state of the switch $S_6$ whether the photographing optical system PS is positioned at an initial position or a final position. In particular, if the switch $S_6$ is on and accordingly a signal "H" is received at the terminal S6, the microcomputer CPU determines that the photographing optical system PS is positioned at neither of its initial positions and final positions and thus advances the sequence to step #4, but otherwise, the sequence is advanced to step #14. At step #14, it is judged from an output of the encoder EN whether or not the photographing optical system is positioned at its final position, and in case a signal "H" is received at the terminal ENC, the microcomputer CPU determines that the photographing optical system PS is positioned at its final position and thus advances the sequence to step #4, or otherwise, the sequence is advanced to step #15. At each of steps #4 and #15, a signal "L" is delivered from the terminal PWC of the microcomputer CPU so that the transistor $Q_1$ is rendered conducting to start supply of power to the line Vcc. After then, the sequence advances to step #5 or #16 at which the shutter is initialized, that is, closed. After initialization of the shutter, the sequence advances from step #16 to step #12 at which the microcomputer CPU judges whether or not initial loading is completed. On the other hand, from step #5, the sequence advances to step #6 at which a film is wound, and then to step #7 at which the lens motor $M_2$ is rotated reversely, whereafter the sequence advances to step #8 at which the photographing optical system PS is set to its initial position. In this manner, when the photographing optical system is stopped during its movement or at its final position, winding of a film is performed and then the photographing optical system PS is returned to its initial position. Accordingly, even if the power source batteries are exhausted so that the photographing optical system PS is stopped in the course of movement thereof to its initial position after completion of an exposure operation, double exposure of a photographed film can be prevented. After the photographing optical system PS is returned to its initial position, a flag F indicating that the camera is being initialized is set at step #9, and then the main capacitor $C_2$ is charged at step #10, whereafter the flag F is cleared at step #11. After then, the sequence advances to step #12 at which it is judged whether or not initial loading is completed. At step #12, if the switch $S_8$ is on and accordingly a signal "H" is received at the terminal S5, the microcomputer CPU determines that initial loading is not yet completed and advances the sequence to step #17. At step #17, if a signal "L" is received at the terminal S4 and consequently the microcomputer CPU determines that a film is loaded in position and the rear lid is closed, the sequence advances to step #18 at which initial loading is performed so that the microcomputer CPU may wait until interruption occurs. To the contrary, in case it is determined at step #12 that initial loading is completed, or in case it is determined at step #17 that either no film is loaded or the rear lid is open, the sequence advances to step #13 at which interruption is enabled and a standby condition for waiting interruption is established.

Figure 14:
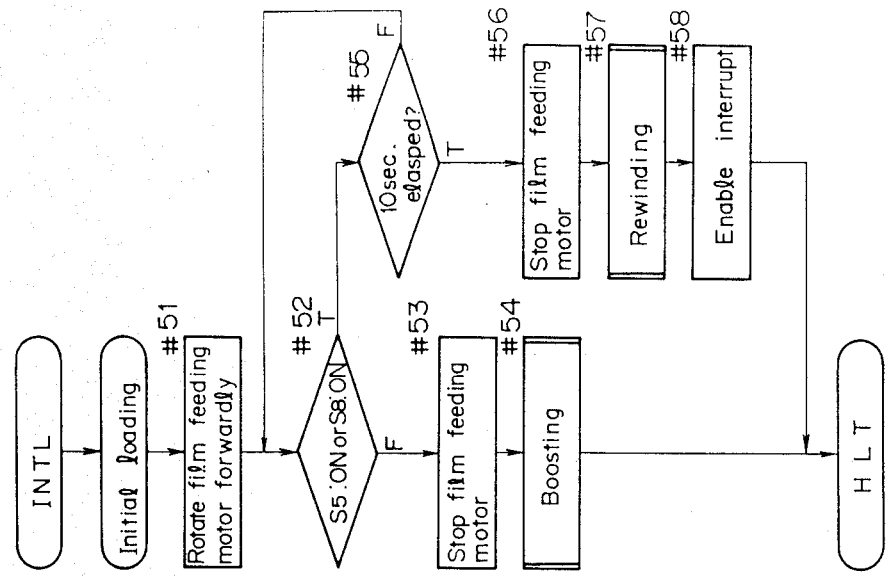

Subsequently, operation when the rear lid is closed while the camera is in a stand-by condition will be described. If the rear lid is closed, the switch $S_7$ is turned on. However, if no film is loaded in position, no change occurs because the switch $S_4$ remains in its off state. If the rear lid is opened and a film is loaded in position into the camera whereafter the rear lid is closed, the switches $S_4$ and $S_7$ are both turned on so that the signal at the input terminal of the one-shot circuit $OC_3$ is changed into "H". The one-shot circuit $OC_3$ detects the rising edge of the signal "H" and delivers a pulse to the terminal INTL of the microcomputer CPU. The microcomputer CPU thus starts its operation in accordance with the flow chart shown in FIG. 14 to start initial loading of a film. Referring to FIG. 14, at first at step #51, the microcomputer CPU delivers a signal from the terminals M thereof to cause the film feeding motor $M_1$ to rotate forwardly to start winding of a film. When the motor $M_1$ is rotated by a predetermined angle, the switch $S_5$ is turned on, and then when the film is wound by a distance corresponding to one frame thereof, the switch $S_5$ is turned on. After then, each time the film is wound by one frame distance, the switch $S_5$ is turned on and off in this manner. On the other hand, the switch $S_8$ remains on till a point of time directly before the film counter is turned to indicate a value "1" whereupon it is turned off. Since the switch $S_5$ and the switch $S_8$ are connected in parallel to each other as described hereinabove, the microcomputer CPU will continuously receive a signal "H" at the terminal S5 thereof until the film counter indicates "1" and winding of the film by one frame distance is completed. Accordingly, winding of the film is stopped at step #52 when reception of the signal "H" at the terminal S5 is stopped. When reception of the signal "H" stops, the microcomputer CPU delivers a signal from the terminals M to stop the film feeding motor $M_1$ at step #53 and to charge the main capacitor $C_2$ at step #54 whereafter it puts the camera into a standby state.

It is to be noted that in case initial loading is not completed at step #55, that is, unless the switch $S_5$ is turned off and the switch $S_8$ is turned off after lapse of an interval of time of 10 seconds after starting of the initial loading, the microcomputer CPU determines that some trouble has arisen during initial loading and thus controls to stop the film feeding motor $M_1$ to stop the initial loading at step #56 and energize the film feeding motor $M_1$ to rewind the film at step #57 whereafter it enables interruption at step #58 and waits for a next instruction.

Now, operation of the camera when the rear lid is opened in error after initial loading of a film is completed and before rewinding of the film is not yet performed will be examined. In such a case, if the rear lid is closed, then a pulse is delivered to the terminal INTL of the microcomputer CPU in a similar manner as described above so that the microcomputer CPU starts its operation in accordance with the flow chart shown in FIG. 14. In this instance, however, the switch $S_8$ remains in its off state. Accordingly, if the film is wound by one frame distance, the sequence advances to step #53 to complete initial loading. Or else, if the film is not wound for 10 seconds, the sequence advances successively to steps #55, #56 and #57 in order to perform rewinding of the film, and then interruption is enabled at step #58 whereafter the microcomputer CPU waits for a next instruction.

Subsequently, operation when the lens cover is opened while the camera is in a stand-by condition will be examined. In this instance, the switch $S_{0-2}$ is instantaneously turned on in response to the opening action of the lens cover, and a pulse thus produced is received at the interrupt terminal INT of the microcomputer CPU. Consequently, the microcomputer CPU starts its operation in accordance with the flow chart shown in FIG. 15. At first, at step #101, a signal "L" is delivered from the terminal FC of the microcomputer CPU to stop a boosting operation, and then at step #102, the microcomputer CPU checks the on-off state of the switch $S_{0-1}$ to determine whether the lens cover is opened or closed. In particular, when the switch $S_{0-1}$ is on and a signal "H" is received at the terminal S01, the microcomputer CPU determines that the lens cover has been opened and thus advances the sequence to step #107. On the contrary, when the switch $S_{0-1}$ is off and accordingly a signal "H" is not received at the terminal S01, the microcomputer CPU determines that the lens cover has been closed and thus advances the sequence to step #103. At step #107, it is judged whether or not the release button is depressed, and if the switch $S_1$ is on and accordingly a signal "H" is received at the terminal S1, the microcomputer CPU determines that the release button has been depressed and thus advances the sequence to step #300, or otherwise, the sequence advances to step #113. At step #113, it is determined whether or not the photographing mode is to be changed, and in case the switch $S_{S/T}$ is on and accordingly a signal "H" is received at the terminal S/T, the microcomputer CPU determines that the photographing mode is to be changed over and thus advances the sequence to step #400. By the way, since external interruption via the terminal INT is caused by turning on or off of the switch $S_{0-2}$, that is, opening or closing of the lens cover, or by turning on of the switch $S_1$, that is, depression of the release button, or else by turning on of the switch $S_{S/T}$, that is, changing over of the photographing mode, if it is determined at step #113 that the photographing mode is not to be changed over, then this means that the microcomputer CPU determines that such interrupiton is caused by opening of the lens cover. Accordingly, in this instance, the sequence advances from step #113 to step #200 in order to cause charging of the main capacitor $C_2$ in preparation for starting of a photographing operation.

Now, operation when the release button is depressed while the lens cover is open will be described. When the release button is depressed to the first position, the switch $S_1$ is turned on so that a pulse is delivered from the one-shot circuit $OC_1$ to the interrupt terminal INT of the microcomputer CPU via the OR circuit OR. Consequently, the microcomputer CPU starts its operation in accordance with the flow chart shown in FIG. 15. In particular, at first the microcomputer CPU controls to stop a boosting operation at step #101. After then, since the lens cover is open, the sequence advances from step #102 to step #107 at which the microcomputer CPU determines that the release button has been depressed and then to step #300. By the way, as seen in the time chart of FIG. 26, a signal "L" is delivered from the terminal PWC of the microcomputer CPU after lapse of a predetermined interval of time after the switch $S_1$ has been turned on. In response to the signal "L", the transistor $Q_1$ is rendered conducting to start supply of power to the power supply line Vcc for the light measuring circuit LM, distance measuring circuit DM, battery checking circuit BC, comparator CO and AE timer circuit AT. Consequently, measurement of light and a distance is started by the light measuring circuit LM and the distance measuring circuit DM, respectively, and the microcomputer CPU thus takes brightness information and measured distance data at step #300. Further at step #300, selection of one of the voltage detecting circuit $VD_1$ and $VD_2$ is performed, and besides if it is determined that the charged voltage of the main capacitor $C_2$ then is not sufficiently high to assure a photographing operation, the release button is locked to prevent a releasing operation of the camera. Detailed description of operation at step #300 will be given hereinbelow.

In case the sequence advances from step #300 to step #108, it is judged at step #108 whether or not the release button is locked, and if the release button is in a locked condition, then the sequence advances to step #200, but on the contrary if the release button is not in a locked condition, the sequence advances to step #109. At step #200, the main capacitor $C_2$ is charged in preparation for starting of a photographing operation.

On the contrary, when the release button is not in a locked condition, the microcomputer CPU judges whether or not the release button is depressed to the second position. If a signal "H" is received at the terminal S2 and accordingly the microcomputer CPU determines at step #109 that the release button has been depressed to the second position to turn the switch $S_2$ on, then the sequence advances to step #500 in order to control an exposure operation of the camera, and after completion of a photographing operation, the microcomputer CPU controls at step #200 to charge the main capacitor $C_2$ in preparation for a subsequent photographing operation.

On the contrary, when the release button is not depressed to the second position and it is determined at step #109 that the switch $S_2$ is off, the sequence advances to step #110 at which the microcomputer CPU judges whether or not the release button remains depressed to the first position. In case the switch $S_1$ is on and accordingly the microcomputer CPU determines that the release button remains depressed to the first position, the sequence is advanced again to step #109 at which it is judged whether the release button is depressed to the second position. Accordingly, the sequence advances in a loop of the steps #109 and #110 until after the release button is depressed to the second position. In the meantime, the measured distance data obtained at step #300 is maintained. Accordingly, focus locking is effected by maintaining the release button in its depressed condition at the first position. It is to be noted that in case the microcomputer CPU determines that switch $S_1$ is off and accordingly the release button is not depressed, that is, when a photographer first depresses the release button to the first position but then releases the release button to return to its initial position giving up the photographing operation, the microcomputer CPU delivers a signal "H" from the terminal PWC thereof to stop supply of power to the power supply line Vcc at step #111 and then delivers a signal "H" from the terminal LMg thereof to stop operation of the electromagnet 17 at step #112. After then, the sequence advances to step #200 to cause charging of the main capacitor $C_2$ in preparation for a subsequent photographing operation.

Figure 27:
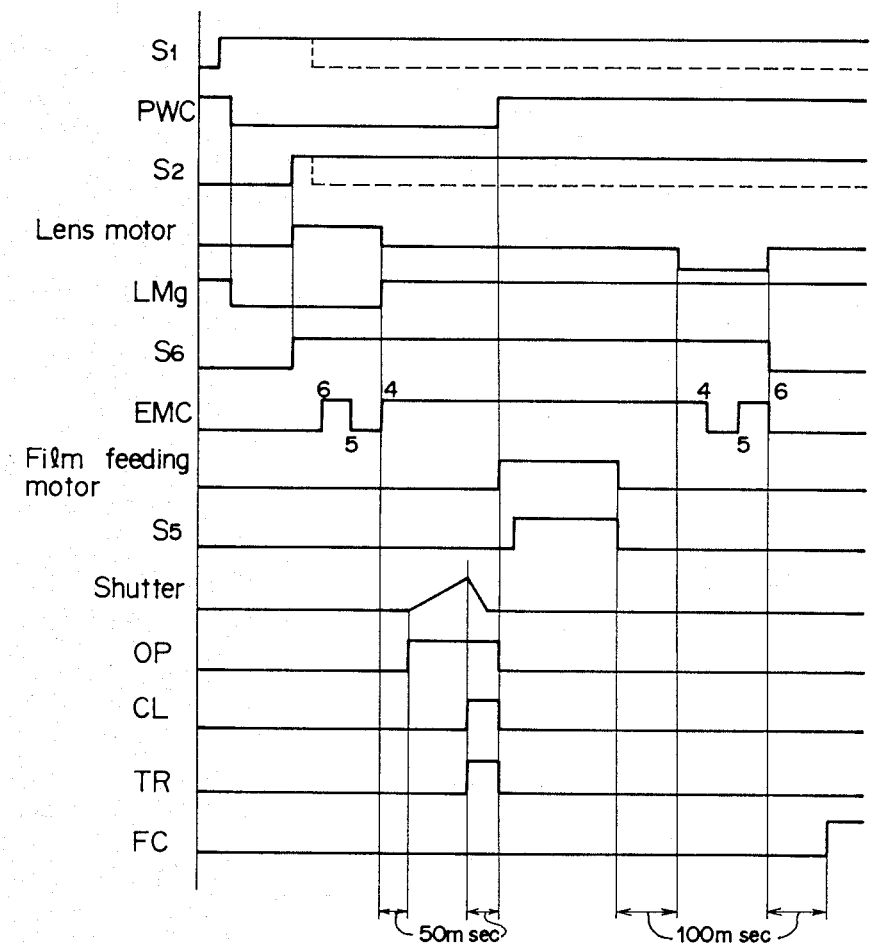
FIG. 27 is a time chart illustrating operation after depression of a release button until starting of charging.

It is to be noted that, even if the release button is kept depressed to keep the switch $S_1$ on after completion of an exposure operation as shown in FIG. 27, the main capacitor $C_2$ is automatically charged at step #200 after the photographing optical system PS is returned to its initial position. Accordingly, the frequency of release locking arising from incomplete charging is reduced, enabling rapid successive photographing operations of the camera. However, since a pulse is produced from the one-shot circuit $OC_1$ only after the switch $S_1$ is turned from an off state to an on state in a stand-by condition of the camera, a subsequent next photographing operation is not performed unless the release button is returned once to its initial position and is then depressed again. Accordingly, if the release button should be kept depressed inadvertently, successive photographing operations are not effected and accordingly a film is not used wastefully. Further, the release button may be returned after the switch $S_2$ is turned on, and operation in such an instance is indicated in broken lines in FIG. 27.

Now, operation when the photographing mode change-over button is depressed while the lens cover is open will be examined. If the photographing mode change-over button is depressed, the switch $S_{S/T}$ is turned on so that a pulse is delivered from the one-shot circuit $OC_2$ to the interrupt terminal INT of the microcomputer CPU via the OR circuit OR. Consequently, the microcomputer CPU starts its operation in accordance with the flow chart shown in FIG. 15. Since the lens cover is open and the release button is not depressed, the microcomputer CPU first stops a boosting operation at step #101 and then advances the sequence, passing through the steps #102 and #107, to step #113 at which it determines that the photographing mode is to be changed over and then to step #400 in order to cause changing over of the photographing mode. After completion of the changing over of the photographing mode, the sequence advances to step #200 in order to cause charging of the main capacitor $C_2$ in preparation for a subsequent photographing operation.

Finally, operation when the lens cover is closed from its open position will be examined. In such an instance, the switch $S_{0-2}$ is instantaneously turned on in a similar manner to the case when the lens cover is opened. A pulse produced then is received at the interrupt terminal INT of the microcomputer CPU via the OR circuit OR, and consequently the microcomputer CPU starts its operation in accordance with the flow chart shown in FIG. 15. Since the lens cover is closed, the switch $S_{0-1}$ assumes an off position. Accordingly, the microcomputer CPU advances the sequence to step #102 and then to step #103 after it has stopped a boosting operation at step #101. At step #103, the microcomputer CPU judges from the on-off state of the switch Sp whether or not the photographing mode the camera is the standard photographing mode or the tele-photographing mode. In particular, when the switch Sp is on and accordingly a signal "L" is received at the terminal SP of the microcomputer CPU, the microcomputer CPU determines that the camera is in the tele-photographing mode and thus advances the sequence to #104, or otherwise, the microcomputer CPU determines that the camera is in the standard photographing mode and thus advances the sequence to step #200.

As given also in the preceding description, the main lens 4a is projected forwardly from the camera body when the camera is in the tele-photographing mode. Accordingly, the lens cover cannot be closed in this condition. Therefore, the lens motor $M_2$ is rotated reversely to cause changing over to the standard photographing mode in order to retract the main lens 4a into the camera body at steps #104 and #105. In this condition, the lens cover will be closed. After then, the main capacitor $C_2$ is caused to charge at step #200 so that, even if the lens cover is opened to effect photographing, there may be no necessity of waiting until the capacitor $C_2$ is charged up.

Figure 15:
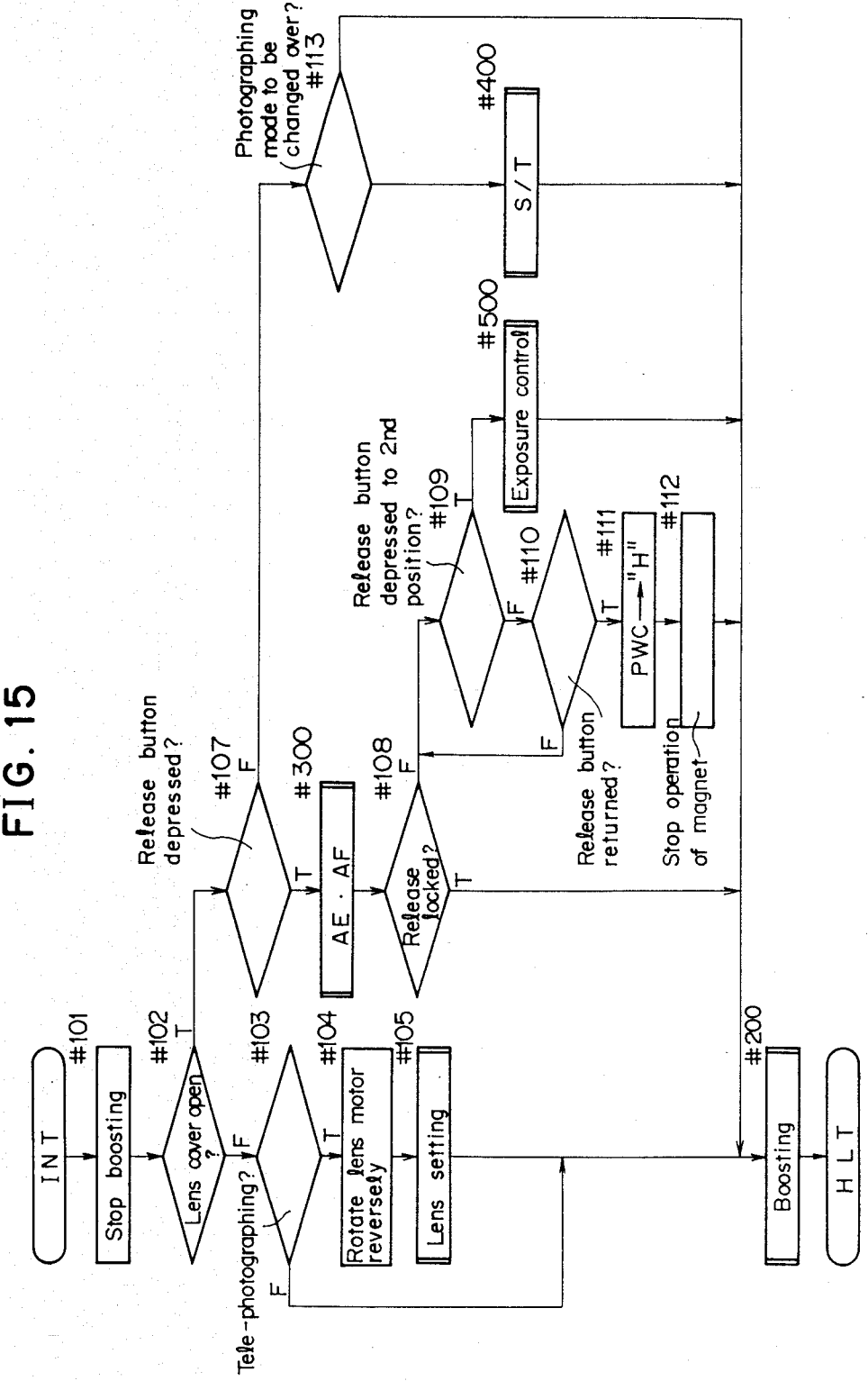

Now, subroutines involved in the flow charts shown in FIGS. 13 to 15 will be described.

Figure 16:
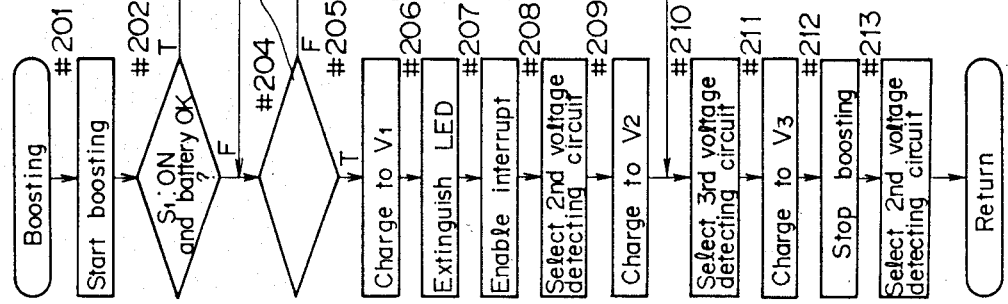

At first, a subroutine named "BOOSTING" for causing charging of the main capacitor $C_2$ will be described with reference to FIG. 16. At first, the microcomputer CPU delivers a signal "H" from the terminal FC thereof to render the boosting circuit D-D operative at step #201. Consequently, the main capacitor $C_2$ begins to charge. Subsequently, the release button is depressed, and if a signal "H" is received at the terminal BC of the microcomputer CPU and the voltage of the power source SE is sufficiently high to drive the camera at step #202, an LED not shown disposed in the viewfinder is lit in order to inform the photographer of such charging at step #203. If either the release button is not depressed or the voltage of the power source SE is not sufficiently high at step #202, the sequence advances to step #204 without lighting the LED. At step #204, the microcomputer CPU judges which one of the two voltage detecting circuits $VD_1$ and $VD_2$ is selected, and in case the first voltage detecting circuit $VD_1$ is selected, the sequence advances to step #205, but in case the second voltage detecting circuit $VD_2$ is selected, the sequence advances to step #214. At step #205, the main capacitor $C_2$ is charged up until the voltage $V_1$ (200 volts) required to drive the piezoelectric element for opening the shutter is reached, and when the main capacitor $C_2$ is charged to the voltage $V_1$ so that a signal "H" is received at the terminal $L_0$ of the microcomputer CPU, the sequence advances to step #206 at which, when the LED is in its lit condition, it is extinguished to inform the photographer of completion of charging. Then, the sequence advances to step #207 at which interruption is enabled and then to step #208 at which the microcomputer CPU delivers signals "L", "H" and "L" from the terminals DT1, DT2 and DT3 thereof, respectively, to effect changing over from the first voltage detecting circuit $VD_1$ to the second voltage detecting circuit $VD_2$. After then, at step #209, the main capacitor $C_2$ is charged to the voltage $V_2$ (265 volts) required to drive the piezoelectric element and to cause the flash device to emit light.

To the contrary, when it is determined at step #204 that the second voltage $VD_2$ is selected, the main capacitor $C_2$ is charged to the voltage $V_2$ at step #214. When the main capacitor $C_2$ is charged to the voltage $V_2$ so that a signal "H" is received at the terminal $L_0$ of the microcomputer CPU, the sequence advances to step #215 at which, when the LED is in its lit condition, the LED is extinguished to inform the photographer of completion of charging, and then to step #216 at which interruption is enabled.

Whichever one of the voltage detecting circuits $VD_1$ and $VD_2$ is selected at a point of time when charging is started, after the main capacitor $C_2$ is charged to the voltage $V_2$, the microcomputer CPU delivers a signal "H" from the terminal DT3 thereof and signals "L" from the terminals DT1 and DT2 thereof in order to select the third voltage detecting circuit $VD_3$ at step #210 and then causes charging of the main capacitor $C_2$ by further 30 volts up to 295 volts ($V_3$) at step #211. After then, when the main capacitor $C_2$ is charged up to the voltage $V_3$ and a signal "H" is received at the terminal $L_0$, the microcomputer CPU delivers a signal "L" from the terminal FC thereof to stop operation of the boosting circuit D-D thereby to stop charging of the main capacitor $C_2$ at step #212. Then, the microcomputer CPU delivers signals "L" from the terminals $DT_1$ and DT3 and a signal "H" from the terminal $DT_2$ thereof to select the second voltage detecting circuit $VD_2$ at step step #213, whereafter the sequence is returned from the subroutine.

Figure 26:
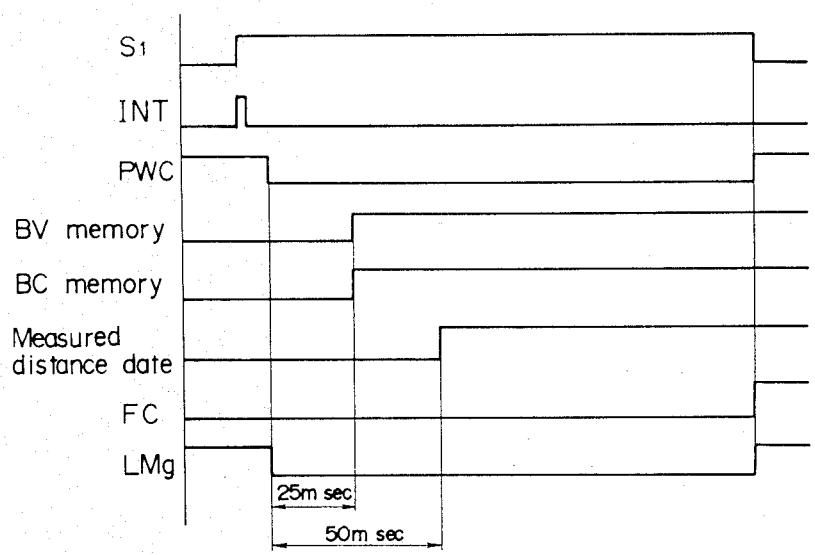
FIG. 26 is a time chart illustrating timings of operations after switching on of a light and distance measuring switch.
Figure 28:
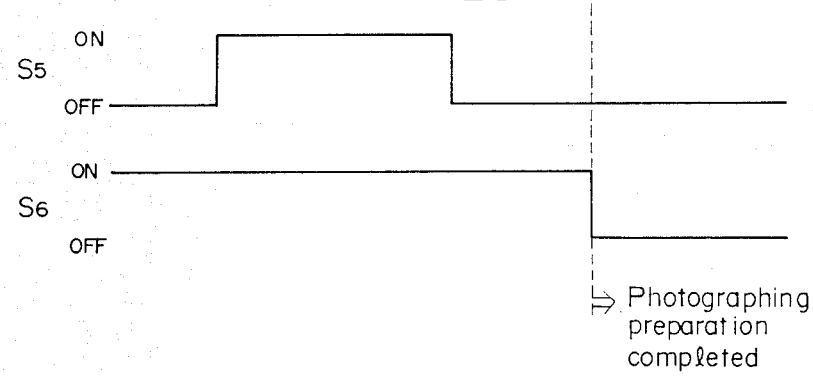
FIGS. 28 and 29 are time charts illustrating operation after completion of exposure until completion of preparation for photographing.

Subsequently, a subroutine "AE/AF" for performing measurement of light and a distance will be described with reference to FIGS. 17 and 26. As given also in the foregoing description, when the predetermined interval of time elapses after depression of the release button, a signal "L" is delivered from the terminal PWC of the microcomputer CPU so that the transistor $Q_1$ is rendered conducting to start measurement of light and a distance and battery checking at step #301, and then a signal "L" is delivered from the terminal LMg to render the electromagnet 17 operative at step #302. After then, at step #303, the microcomputer CPU waits for an interval of time of 25 milliseconds until outputs of the light measuring circuit LM and the battery checking circuit BC are stabilized, and then a result of such battery checking is latched at step #304. In particular, in case the voltage of the power source SE is sufficiently high to drive the camera, a signal "H" is transmitted to the terminal BC of the microcomputer CPU, but on the contrary if the voltage of the power source SE is not sufficiently high, a signal "L" is received. The signal is latched by a BC memory provided in the microcomputer CPU. Subsequently, a result of light measurement is latched by a Bv memory also provided in the microcomputer CPU at step 305, and then at step #306, the brightness of the object is determined. In particular, if a signal "H" is received at the terminal Bv of the microcomputer CPU and accordingly the microcomputer CPU determines that the object is sufficiently bright so that there is no necessity of causing the flash device to emit light, the microcomputer CPU delivers signals "H", "L" and "L" from the terminals DT1, DT2 and DT3, respectively, thereof to select the first voltage detecting circuit $VD_1$ as an operative voltage detecting circuit at step #307. On the contrary, when a signal "L" is received at the terminal Bv and accordingly the microcomputer CPU determines that the object is not sufficiently bright so that there is the necessity of causing the flash light to emit light, the microcomputer CPU delivers signals "L", "H" and "L" from the terminals DT1, DT2 and DT3, respectively, thereof to select the second voltage detecting circuit $VD_2$ as an operative voltage detecting circuit at step #316. After then, the microcomputer CPU waits for another interval of time of 25 milliseconds (a total of 50 milliseconds) until distance measurement is completed at step #308 or step #317, whereafter it reads the measured distance data of 3 bits from the terminals $D_2$, $D_1$, $D_0$ at step #309 or #318. Where the first voltage detecting circuit $VD_1$ is selected, if it is judged from the measured distance data at step #310 that the object is in the nearmost zone (0th zone), the microcomputer CPU delivers signals "L", "H" and "L" from the terminals DT1, DT2 and DT3, respectively, thereof to change over the operative voltage detecting circuit to the second voltage detecting circuit $VD_2$ at step #319 and then latches a signal "L" in the Bv memory at step #320. As a result, where the object is in the nearmost zone, the flash device is caused to emit light with the aperture reduced further than normal to increase the depth of viewfield in order to prevent an out of focus condition in short distance photographing. Accordingly, shortage in amount of light by reduction in aperture can be compensated for. Further, only by moving the photographing optical system PS to the first zone as described hereinabove, a photograph can be taken wherein the focus is adjusted in the 0th zone.

Subsequently, at step #311, the microcomputer CPU determines from a signal received at the terminal $L_0$ thereof whether or not the main capacitor $C_2$ has been charged to the preset voltage $V_1$ or $V_2$. In particular, if a signal "H" is received at the terminal $L_0$, the microcomputer CPU determines that the capacitor $C_2$ is charged up to the preset voltage and thus advances the sequence to step #321. On the contrary, if a signal "L" is received, the microcomputer CPU determines that intended charging is not yet completed and thus advances the sequence to step #312 at which the release button is locked and then to step #313 at which supply of power to the power supply line Vcc is interrupted, whereafter operation of the electromagnet 17 is stopped at step #314. After then, the main capacitor $C_2$ is caused to be charged at step #315, whereafter the sequence escapes from the subroutine "AE/AF".

To the contrary, if it is determined at step #311 that the main capacitor $C_2$ is charged to the preset voltage $V_1$ or $V_2$, the result of battery checking latched in the BC memory is checked at step #321, and if a signal "L" is stored in the BC memory and the voltage of the power source SE is not sufficiently high, then the release button is locked at step #322 and then supply of power to the power supply line Vcc is interrupted at step #323 whereafter operation of the electromagnet 17 is stopped at step #324. Or otherwise, the release lock is canceled at step #325. After then, the sequence escapes from the subroutine "AE/AF" in either case.

Figure 18:
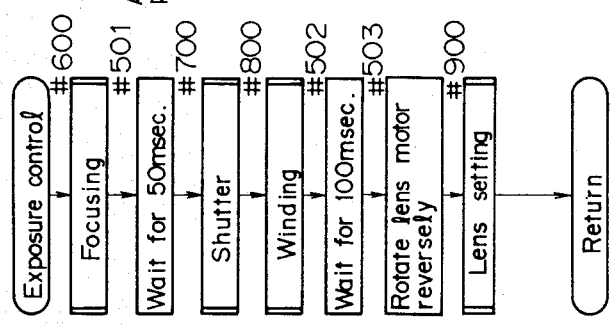

Now, a subroutine "EXPOSURE CONTROL" for causing release of the camera will be described with reference to FIGS. 18 and 27. When the switch $S_2$ is turned on and the subroutine is entered, at first a focusing operation is performed at step #600. As described hereinabove, after the photographing optical system PS is moved to a focused position or its final position and is stopped at the position, the microcomputer CPU waits for 50 milliseconds at #501 in order to wait until the photographing optical system PS is stopped with certainty, and then the shutter is opened to start an exposure operation at step #700. After completion of the exposure operation, a film is wound at step #800, and then the microcomputer CPU waits, st step #502, for 100 milliseconds until the film feeding motor $M_1$ is stopped completely. After then, the lens motor $M_2$ is rotated reversely at step #503, and then the photographing optical system PS is returned to its initial position at step #900. After returning of the photographing optical system PS to its initial position, the sequence escapes from the subroutine.

Here, returning of the photographing optical system PS to its initial position after winding of a film after completion of an exposure operation will be examined more in detail. It is to be noted that since simultaneous energization of the film feeding motor $M_1$ and the lens motor $M_2$ require a correspondingly high capacity of the power source SE and therefore is not desirable, the two motors $M_1$ and $M_2$ are not rotated in a simultaneous relationship.

Figure 29:
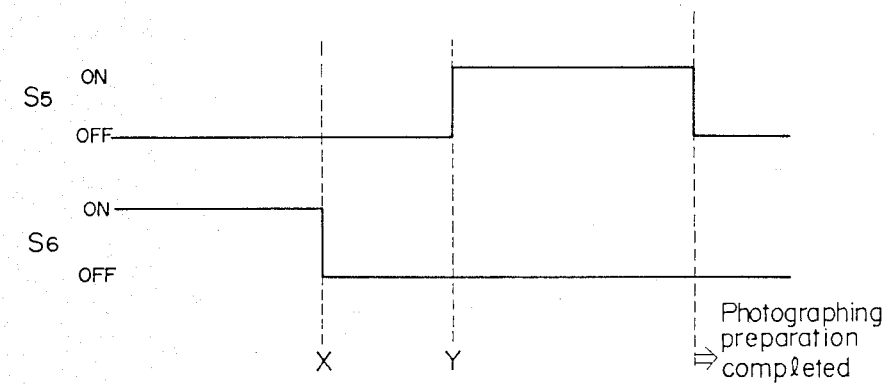

As apparently seen from the time chart shown in FIG. 29, if winding of a film is performed after returning of the photographing optical system PS after completion of an exposure operation, the same conditions of the switches $S_5$ and $S_6$ as their conditions when a photographing operation (operation from starting of a releasing operation to completion of preparation for a subsequent photographing operation) is completed, that is, when preparation for a subsequent photographing operation is completed, will appear for an interval of time X-Y before the film feeding motor $M_1$ is rotated by a predetermined angle at Y after the photographing optical system PS has been returned to its initial position at X. If the power source batteries are exhausted or exchanged within the time interval X-Y, then the microcomputer CPU will judge, during its initializing operation, that the camera is in the initial condition, that is, in a condition in which it is prepared for a subsequent photographing operation, and accordingly will cause exposure of the photographed film, that is, double exposure of the film. In order to prevent this, a switch for detecting completion of preparation for a photographing operation must be additionally provided, which will increase the number of components of the camera and hence the production cost of the camera.

To the contrary, if winding of a film is performed precedingly as in the present embodiment, the two switches $S_5$ and $S_6$ are both turned off only after preparation for a subsequent photographing operation is completed, that is, only after winding of a film is completed and then the photographing optical system PS is returned to its initial position. Accordingly, completion of preparation for a photographing operation can be detected without provision of an additional switch. Further, the states of the switches $S_5$ and $S_6$ before winding of a film is performed are off and on, respectively, and are quite same as the states of them before the photographing optical system PS is returned to its initial position after completion of winding of the film, but if the film is wound by one frame distance each time the power source batteries are exchanged before completion of preparation for a photographing operation (refer to steps #6 and #7 of FIG. 13), double exposure will never occur.

Thus, comparing with a conventional camera wherein, after completion of an exposure operation, a photographing optical system is first returned to its initial position and then a film is wound, a switch for detecting a photographing preparation completed condition which switch is required in order to prevent double exposure can be eliminated only by changing the order of a film winding operation and a lens returning operation.

Figure 19:
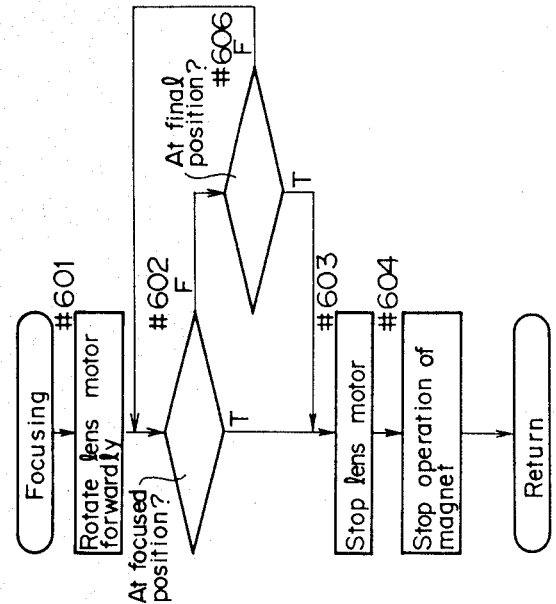

Now, a subroutine "FOCUSING" for actuating the photographing optical system PS to a focused position will be described with reference to FIGS. 19 and 12. In the subroutine, at first the lens motor $M_2$ is rotated forwardly at step #601. Consequently, the switch $S_6$ is soon turned on. As the lens motor $M_2$ is rotated forwardly, pulses are delivered from the encoder EN to the microcomputer CPU which thus counts the pulses to determine which zone is reached by the photographing optical system PS as described hereinabove. Then at step #602, the zone reached by the photographing optical system PS is compared with a zone represented by measured distance data $D_2$, $D_1$, $D_0$, and if the two zones coincide with each other, the sequence advances to step #603 at which the lens motor $M_2$ is stopped and then to step #604 at which operation of the electromagnet 17 which was rendered operative at step #302 is stopped in order to stabilize the position of the photographing optical system PS. On the contrary, when the two zones do not coincide with each other at step #602, the sequence advances to step #606 at which the microcomputer CPU judges whether or not the photographing optical system PS has reached its final position. In particular, when it is determined at step #606 from the fact that the output of the encoder EN is "H" and the switch $S_6$ is off that the photographing optical system PS has reached its final position, the sequence advances to step #603 at which the microcomputer CPU controls to stop the lens motor $M_2$ in a similar manner to that when a focused condition is reached, and then to step #604 at which operation of the electromagnet 17 is stopped.

To the contrary, when it is judged at step #606 that the photographing optical system PS does not yet reach its final position, the sequence returns to step #602 at which it is judged whether the photographing optical system PS has reached a focused position. Thus, the sequence advances in a loop formed by the steps #602 and #606 until the photographing optical system PS reaches a focused position. If the photographing optical system PS reaches a focused position or its final position so that the lens motor $M_2$ is stopped, then the sequence returns to the subroutine "EXPOSURE CONTROL".

It is to be noted that the subroutine "FOCUSING" applies to both of the standard photographing mode and the tele-photographing mode. An effect of the construction wherein it is detected by a combination of the encoder EN and the switch $S_6$ that the photographing optical system PS has reached its final position will be hereinafter described.

Figure 20:
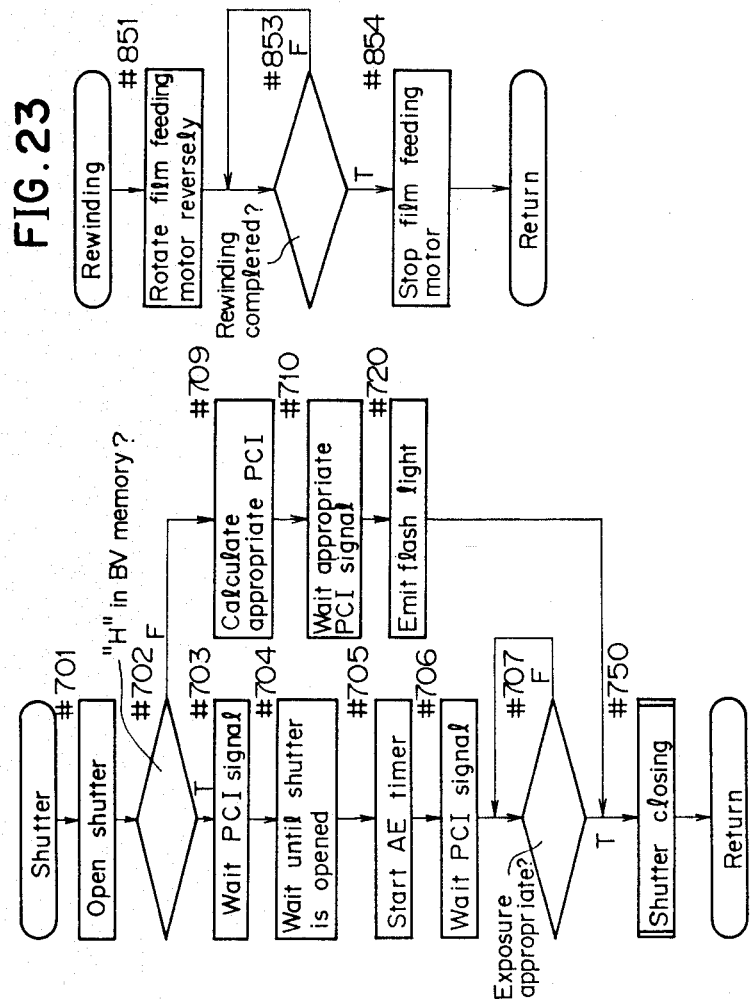

Now, a subroutine "SHUTTER" for opening and closing the shutter will be described with reference to FIGS. 20 and 27. In the subroutine, the microcomputer CPU delivers, at first at step #701, a signal "H" from the terminal OP thereof to cause a line VH to apply a voltage to the piezoelectric element. Subsequently, the contents of the Bv memory are checked at step #702, and if the contents of the Bv memory are "H" and accordingly the object is sufficiently bright and is not in the nearmost zone (0th zone) so that the flash device need not emit light, the sequence advances to step #703, but otherwise if the contents of the Bv memory are "L" and accordingly the object is not sufficiently bright or the object is in the nearmost zone (0th zone) so that there is the necessity of causing the flash device to emit light, the sequence advances to step #709. At step #703, the microcomputer CPU waits until a monitor signal of a shutter operation from the shutter driving circuit SD is received at the terminal PCI thereof, and when a monitor signal of shutter movement is received and the microcomputer CPU detects that the shutter has been actuated, the microcomputer CPU waits at step #704 until just before the shutter is opened. After then, the AE timer circuit AT is rendered operative at step #705, and then at step #706, the microcomputer CPU waits until a second monitor signal of the shutter movement is received. The second monitor signal of the shutter movement is produced when the shutter is opened to a position in which it provides a minimum diaphragm aperture, and the step #706 is provided in order that the shutter may be opened with certainty. In particularly, before the shutter is opened to a minimum aperture providing position thereof, the microcomputer CPU will not produce an instruction to close the shutter even if it receives an exposure completion signal from the AE timer circuit AT as hereinafter described.

After the shutter has been opened to its minimum aperture providing position, the microcomputer CPU waits at step #707 until it receives at the terminal AE thereof from the AE timer circuit AT a signal "H" which is delivered when the timer circuit AT detects that an appropriate exposure is obtained by a known method. When it is determined at step #707 that an appropriate exposure has been optained, the sequence advances to step #750 at which the shutter is closed.

To the contrary, at step #709, an appropriate diameter of the exposure aperture of the shutter is calculated from ISO sensitivity information and measured distance information, and then at step #710, the microcomputer CPU waits until it receives a monitor signal of the shutter movement to a position corresponding to the appropriate expsoure aperture diameter. After then, the microcomputer CPU delivers a signal "H" from the terminal TR thereof to cause the flash device FL to emit light at step #720, and then advances the sequence to step #750 at which the shutter is closed.

Subsequently, a subroutine "SHUTTER CLOSING" for closing the shutter will be described with reference to FIG. 21. In the subroutine, at first the microcomputer CPU delivers a signal "H" from the terminal CL thereof at step #751. It is to be added that at the same time a signal "H" is delivered also from the terminal OP of the microcomputer CPU. Consequently, the piezoelectric element is short-circuited so that the shutter is closed. After then, the microcomputer CPU waits for 50 milliseconds at step #752 until the shutter is closed completely. After lapse of 50 milliseconds, a signal "H" is delivered at step #753 from the terminal PWC of the microcomputer CPU so that the transistor $Q_1$ is turned off to stop supply of power to the power supply line Vcc. Finally, the sequence escapes from the subroutine.

Figure 22:
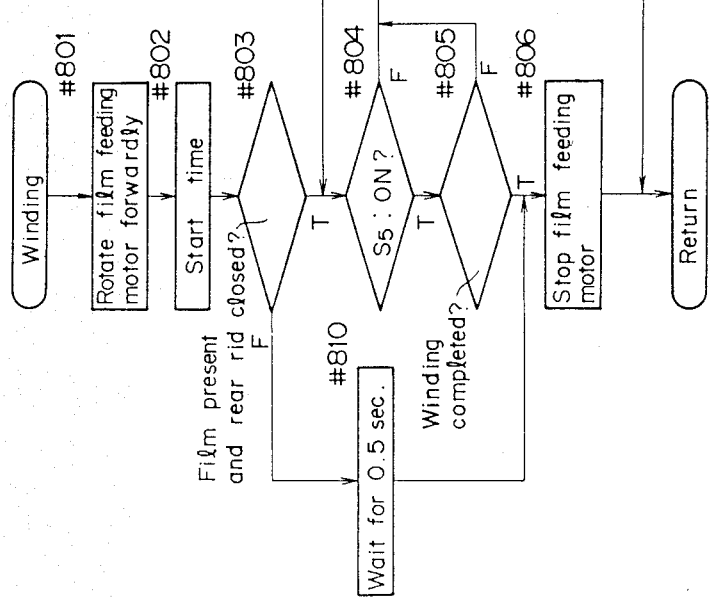

Now, a subroutine "WINDING" for winding a film by one frame distance will be described with reference to FIGS. 22 and 27. In the subroutine, at first at step #801, a signal is delivered from the terminals M of the microcomputer CPU to cause the film feeding motor $M_1$ to rotate forwardly, and then operation of the timer is started at step #802. Then, it is judged at step #803 whether or not a film is loaded in position and the rear lid is closed, and if a signal "L" is received at the terminal S4 of the microcomputer CPU, the microcomputer CPU judges that a film is loaded in position and the rear lid is closed and thus advances the sequence to step #804. Or otherwise, the sequence advances to step #810 at which the microcomputer CPU waits until the timer counts 0.5 seconds and then to step #806 at which the microcomputer CPU delivers a signal from the terminals M thereof to stop rotation of the film feeding motor $M_1$. Meanwhile, at step #804, the on-off state of the switch $S_5$ is checked in order to judge whether or not the film feeding motor $M_1$ has been rotated by a predetermined angle. If the motor $M_1$ has started its rotation and the switch $S_5$ is turned on, then the sequence advances to step #805, or otherwise the sequence advances to step #808. It is to be noted that the on-off state of the switch $S_5$ can be detected at step #804 because the switch $S_8$ is off due to completion of the initial loading. At step #805, it is detected whether or not winding of a film by one frame distance is completed. If it is detected that the switch $S_5$ is off and accordingly winding of the film by one frame distance has been completed, the sequence advances to step #806 at which a signal is delivered from the terminals M of the microcomputer CPU to stop the film feeding motor $M_1$. After then, the sequence returns from the subroutine.

To the contrary, if it is judged at step #805 that the switch $S_5$ remains on and accordingly winding of the film by one frame distance is not yet completed, the sequence advances to step #808. At step #808, the microcomputer CPU judges whether or not a preset time (typically 4.1 seconds) which is longer than a time required to wind up a film by one frame distance has elapsed after starting of rotation of the film feeding motor $M_1$, and if the preset time does not yet elapse, the microcomputer CPU judges that a film is being wound and thus returns the sequence to step #804. Consequently, the sequence advances in a loop including the steps #804, #805 and #808 until the winding operation by one frame distance is completed. When it is judged at step #808 that the preset time (4.1 seconds) longer than a time required to wind up a film by one frame distance has elapsed, the microcomputer CPU determines that either the film has been entirely wound up or some trouble has arisen to stop the film in a taut condition and thus delivers, at step #809, a signal from the terminals M thereof to stop the film feeding motor $M_1$ whereafter the film is rewound at step #850. When rewinding of the film is completed, the sequence escapes from the subroutine.

Figure 23:
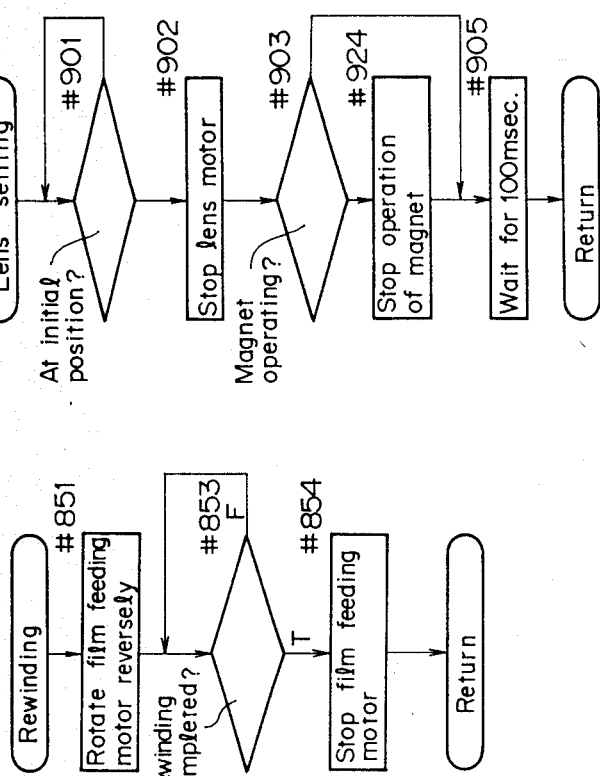

Subsequently, a subroutine "REWINDING" for rewinding a film will be described with reference to FIG. 23. In the subroutine, at first at step #851, the microcomputer CPU delivers a signal from the terminals M thereof to rotate the film feeding motor $M_1$ reversely to start rewinding of a film. At the same time, the switch $S_9$ is turned on. After then, the rewinding operation is continued at step #853 until the switch $S_4$ is turned off so that the microcomputer CPU judges that the film has been rewound completely. When the switch $S_4$ is turned off and accordingly completion of the intended rewinding is judged at step #853, the microcomputer CPU delivers, at step #854, a signal from the terminals M thereof to stop the film feeding motor $M_1$, and then the sequence returns from the subroutine.

By the way, since the switch $S_9$ is turned on when rewinding is started and turned off when the rear lid is opened as described hereinabove, even if the power source batteries are exhausted and thus exchanged during a rewinding operation, the microcomputer CPU can discriminate proceeding rewinding by checking an on-off state of the switch $S_9$ and accordingly can cause rewinding in initialization of the camera thereby to prevent double exposure of a film (refer to FIG. 13). It is to be noted that since the switches $S_4$ and $S_7$ are connected in series, if the rear lid is opened during proceeding of a rewinding operation, the sequence will advance from step #853 to step #854 at which the microcomputer CPU controls to stop the rewinding operation.

Figure 24:
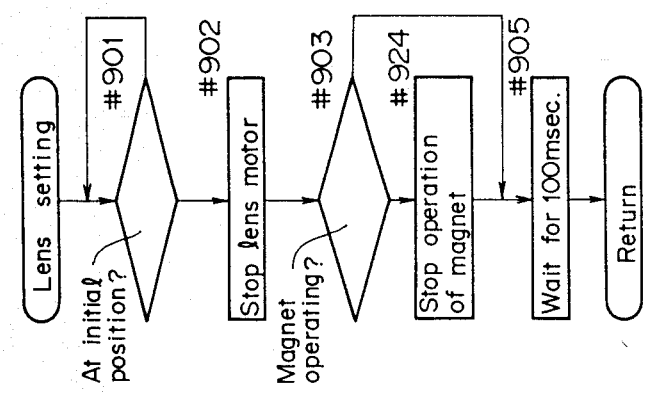

Now, a subroutine "LENS SETTING" for setting the photographing optical system PS to its initial position will be described with reference to FIG. 24. This subroutine is entered only directly after the lens motor $M_2$ has started its rotation, and accordingly the switch $S_6$ is in its on state. Thus, at first at step #901, the photographing optical system PS is moved until the encoder EN provides an output "L" and the switch $S_6$ is turned off so that the microcomputer CPU judges that the photographing optical system PS has reached its initial position in the standard photographing mode or the telephotographing mode. When the photographing optical system PS reaches its initial position, the microcomputer CPU delivers a signal from the terminals M thereof to stop the lens motor $M_2$ at step #902, and then in case it is judged at step #903 that the electromagnet 17 is operating, the microcomputer CPU delivers a signal "H" from the terminal LMg thereof to stop operation of the electromagnet 17 at step #904. After then, the microcomputer CPU waits at step #905 for 100 milliseconds until the lens motor $M_2$ is completely stopped, whereafter the sequence returns from the subroutine.

In this manner, the microcomputer CPU determines, in the subroutine "LENS SETTING", that the photographing optical system PS has been returned to its initial position when the output of the encoder EN is "L" and the switch $S_6$ is turned off. Further, the microcomputer CPU determines that the photographing optical system PS has reached its final position when the output of the encoder EN is "H" and the switch $S_6$ is turned off as given in the description of the subroutine "FOCUSING" with reference to FIG. 19. In this manner, it can be judged from an output of the encoder EN which produces a signal for focusing control and an on-off state of the switch $S_6$ that the photographing optical system PS is positioned at its initial position or at its final position. Accordingly, the number of switches for detecting a position of the photographing optical system can be reduced as described below.

At first, an arrangement is examined wherein a member for moving a photographing optical system for changing over of the photographing mode and a member for moving the photographing optical system for focusing are provided independently of each other. In this instance, up to 4 switches are required including a pair of switches S% and T% for detecting that the photographing optical system has reached either of its initial positions for the standard and tele-photographing modes when the photographing mode is to be changed over, a switch Ss for detecting that the photographing optical system has returned to its initial position after completion of an exposure operation, and a switch Se for detecting that the photographing optical system has reached its final position during a focusing operation.

By the way, where the member for moving the photographing optical system for changing over of the photographing mode also serves as the member for moving the photographing optical system to a focused position for focusing, the switch Ss can be substituted by the switches $S_\infty$ and $T_\infty$. Or otherwise, where a switch Sp for detecting a photographing mode is provided, a combination of the switches Sp and Ss can have the same functions as the switches $S_\infty$ and $T_\infty$. In summary, the three switches $S_\infty$, $T_\infty$ and Se or the three switches Ss, Se and Sp can have the same functions as the four switches $S_\infty$, $T_\infty$, Ss and Se, and accordingly, the number of switches can be reduced by one.

Further, where a switch $S_6$ which is turned off only when the photographing optical system reaches its initial position or its final position as provided in the present embodiment is combined with an encoder EN for delivering a signal for focusing, the combination can have the same functions as the switches $S_\infty$, $T_\infty$ and Se or Ss, Se and Sp. In other words, only by a combination of a switch $S_6$ and an encoder EN, it can be detected that the photographing optical system has reached its initial position in either of the standard and tele-photographing modes upon changing over of the photographing mode, that the photographing optical system has returned its initial position after completion of an exposure operation, and that the photographing optical system has reached its final position during a focusing operation. Accordingly, the number of switches can be further reduced.

Since the number of switches can be reduced in this manner, the construction of the circuit can be simplified. Besides, since the photographing optical system PS is moved by the single common member, switch devices can be located at a single location where the switches $S_6$ and Sp and the encoder EN are formed on the single member. Accordingly, mounting of the switches can be facilitated.

Figure 25:
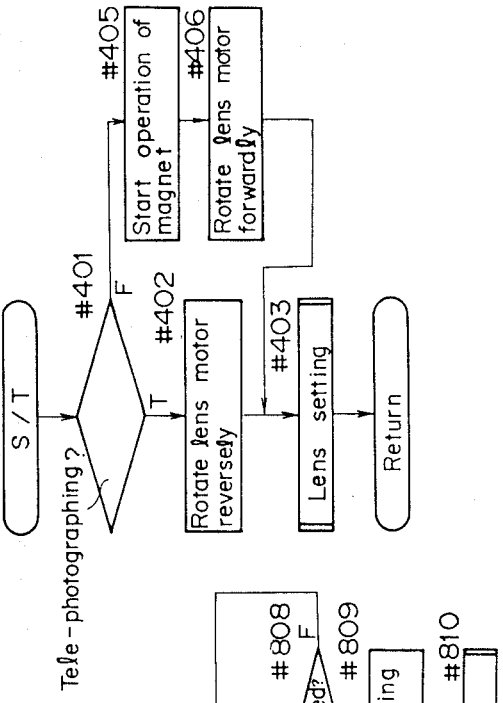

Now, a subroutine "S/T" for changing over the photographing mode will be described with reference to FIGS. 25 and 12. In the subroutine, at first the present photographing mode is judged at step #401. The judgment is made by detecting the on-off state of the switch Sp, and when the switch Sp is on and accordingly a signal "L" is received at the terminal SP of the microcomputer CPU, the microcomputer CPU judges that the camera is in the tele-photographing mode, or otherwise the microcomputer CPU judges that the camera is in the standard photographing mode. In case it is judged at step #401 that the camera is in the tele-photographing mode, the sequence advances to step #402 at which the microcomputer CPU delivers a signal from the terminals M to rotate the lens motor $M_2$ reversely. On the contrary, if it is judged at step #401 that the camera is in the standard photographing mode, the sequence advances to step #405 at which the microcomputer CPU delivers a signal "L" from the terminal LMg thereof to render the electromagnet 17 operative and then to step #406 at which the microcomputer CPU delivers a signal from the terminals M thereof to rotate the lens motor $M_2$ forwardly. If the lens motor $M_2$ is rotated to start movement of the photographing optical system PS at step #402 or #406, the switch $S_6$ is soon turned on. After then, the sequence advances to step #403 at which the photographing optical system PS is set to its initial position, whereafter the sequence returns from the subroutine. It is to be noted that the on-off state of the switch Sp is reversed in the course of changing over of the photographing mode as apparently seen from FIG. 12.

Having now fully described the invention, it will be apparent to one of ordinary skill in the art that many changes and modifications can be made thereto without departing from the spirit and scope of the invention as set forth herein.

What is claimed is:
1. A camera, comprising:
   a single chargeable means;
   a boosting means for boosting a voltage of a power source to supply a high voltage to charge said chargeable means;
   a piezoelectric actuator element for actuating the shutter of said camera;

a first voltage detecting means for detecting that said chargeable means is charged to a first voltage required to drive said piezoelectric actuator element;

a flash light emitting means;

a second voltage detecting means for detecting that said chargeable means is charged to a second voltage required to drive said piezoelectric element and cause said flash light emitting means to emit light;

a light measuring means for measuring a brightness of an object; and a selecting means operable in response to an output of said light measuring means for selecting said first voltage detecting means when the brightness of the object is higher than a predetermined brightness and for selecting said second voltage detecting means when the brightness of the object is lower than the predetermined brightness.

2. A camera as claimed in claim 1, further comprising a distance measuring means for measuring a distance to an object, and wherein said selecting means selects said second voltage detecting means in response to an output of said distance measuring means when the distance to the object is smaller than a predetermined distance.

3. A camera as claimed in claim 1 or 2, wherein a releasing operation of said camera is locked when said selecting means selects said first voltage detecting means and said chargeable means is not charged to said first voltage or when said selecting means selects said second voltage detecting means and said chargeable means is not charged to said second voltage.

4. A camera, comprising:

a single chargeable means;

a boosting means for boosting a voltage of a power source to supply a high voltage to charge said chargeable means;

a piezoelectric actuator element for actuating the shutter of said camera;

a first voltage detecting means for detecting that said chargeable means is charged to a first voltage required to drive said piezoelectric actuator element;

a flash light emitting means; and a second voltage detecting means for detecting that said chargeable means is charged to a second voltage required to drive said piezoelectric element and cause said flash light emitting means to emit light.

5. A camera as claimed in claim 4, further comprising a distance measuring means for measuring a distance to an object, and wherein said selecting means selects said second voltage detecting means in response to an output of said distance measuring means when the distance to the object is smaller than a predetermined distance.

* * * * *